US008917611B2

(12) United States Patent
Poon et al.

(10) Patent No.: US 8,917,611 B2
(45) **Date of Patent: *Dec. 23, 2014**

(54) CORE SERVICES PLATFORM FOR WIRELESS VOICE, DATA AND MESSAGING NETWORK SERVICES

(75) Inventors: Terrence Poon, Fremont, CA (US); Suparna Kumar, Sunnyvale, CA (US); Sunil P. Sheshadri, Sunnyvale, CA (US); Carl Keller, Danville, CA (US); Amit Gupta, Livermore, CA (US); Scott Potter, Los Gatos, CA (US); Curtis Govan, McKinney, TX (US); Macario Namie, San Francisco, CA (US); Jahangir Mohammed, Saratoga, CA (US); Daniel Collins, McKinney, TX (US); Scott Barkley, San Mateo, CA (US); Jack McGwire, Sunnyvale, CA (US)

(73) Assignee: Jasper Technologies, Inc., Mountain View, CA (US)

( * ) Notice: Subject to any disclaimer, the term of this patent is extended or adjusted under 35 U.S.C. 154(b) by 376 days.

This patent is subject to a terminal disclaimer.

(21) Appl. No.: 13/341,800

(22) Filed: Dec. 30, 2011

(65) Prior Publication Data

US 2012/0231785 A1 Sep. 13, 2012

Related U.S. Application Data

(63) Continuation-in-part of application No. 12/387,962, filed on May 7, 2009, now Pat. No. 8,391,161, and a continuation-in-part of application No. 12/652,694, filed on Jan. 5, 2010, now Pat. No. 8,325,614.

(60) Provisional application No. 61/501,131, filed on Jun. 24, 2011.

(51) Int. Cl.

| | |
|---|---|
| ***H04L 1/00*** | (2006.01) |
| ***H04M 15/00*** | (2006.01) |
| ***H04W 24/04*** | (2009.01) |
| ***H04W 4/24*** | (2009.01) |
| *H04W 24/08* | (2009.01) |

(52) U.S. Cl.

CPC .............. *H04W 24/04* (2013.01); *H04M 15/85* (2013.01); *H04M 15/83* (2013.01); *H04M 15/8016* (2013.01); *H04W 4/24* (2013.01); *H04W 24/08* (2013.01); *H04M 15/835* (2013.01); *H04M 15/66* (2013.01); *H04M 15/80* (2013.01)

USPC ........... 370/242; 370/332; 715/700; 455/405; 455/406; 379/114.17

(58) Field of Classification Search

CPC ..... H04L 41/0631; H04L 43/06; H04L 43/10; H04L 41/0677; G01R 31/08; H04W 12/08; H04W 24/02

USPC .......... 370/242, 253, 332, 351, 352; 715/700; 455/405, 406, 414.02; 379/114.17, 379/32.04

See application file for complete search history.

(56) References Cited

U.S. PATENT DOCUMENTS 6,956,820 B2 * 10/2005 Zhu et al. .................. 370/230.1
6,999,480 B2 2/2006 Subrahmanyan et al.

(Continued)

OTHER PUBLICATIONS

Office action dated Dec. 20, 2013 from corresponding U.S. Appl. No. 13/963,830.

(Continued)

*Primary Examiner* — Ayaz Sheikh
*Assistant Examiner* — Mounir Moutaouakil
(74) *Attorney, Agent, or Firm* — Blakely Sokoloff Taylor & Zafman, LLP

(57) ABSTRACT

A system for managing wireless devices in a wireless network comprising: a processor; and a memory coupled with the processor, wherein the memory is configured to provide the processor with instructions which when executed cause the processor to: receive a diagnostic request to analyze a problem associated with a wireless device operating in the wireless network; retrieve diagnostic information associated with the wireless device from the wireless network; retrieve diagnostic information associated with the wireless device from the wireless device; determine at least one solution for the problem associated with the wireless device based on the retrieved diagnostic information from the wireless network and the wireless device; transmit the at least one solution; and receive a confirmation that the problem has been resolved.

18 Claims, 22 Drawing Sheets

(56) References Cited

U.S. PATENT DOCUMENTS 7,369,528 B2 5/2008 Tian
7,483,694 B2 1/2009 Varanda
7,610,045 B2 10/2009 Little et al.
7,620,162 B2 11/2009 Aaron et al.
7,885,636 B2 2/2011 Taglienti et al.
8,018,955 B2 9/2011 Agarwal et al.
8,023,425 B2 9/2011 Raleigh
8,036,664 B2 10/2011 Khetawat et al.
8,099,078 B2 1/2012 Lazaridis
8,122,062 B2 2/2012 Brendle et al.
8,214,536 B2 7/2012 Zhao
8,229,812 B2 7/2012 Raleigh
8,250,207 B2 8/2012 Raleigh
8,264,687 B2 9/2012 Lundquist et al.
8,295,817 B2 10/2012 Alfano et al.
8,306,534 B2 11/2012 Yach et al.
8,346,225 B2 1/2013 Raleigh
8,351,898 B2 1/2013 Raleigh
8,355,337 B2 1/2013 Raleigh
8,391,834 B2 3/2013 Raleigh
8,411,604 B2 4/2013 Reif
8,565,101 B2 10/2013 Poon et al.
2002/0072359 A1 6/2002 Moles et al.
2002/0095483 A1 7/2002 Lee et al.
2003/0086425 A1 5/2003 Bearden et al.
2004/0049394 A1* 3/2004 Burger et al. .................... 705/1
2004/0113929 A1 6/2004 Matsuzaki
2005/0020243 A1 1/2005 Benco et al.
2005/0060250 A1* 3/2005 Heller et al. .................... 705/34
2005/0233733 A1* 10/2005 Roundtree et al. ......... 455/414.1
2005/0266825 A1 12/2005 Clayton
2006/0035631 A1 2/2006 White et al.
2006/0195891 A1 8/2006 Freyan et al.
2006/0203739 A1* 9/2006 Padmanabhan et al. ...... 370/252
2007/0245238 A1 10/2007 Fugitt et al.
2007/0268631 A1 11/2007 Guo et al.
2008/0076419 A1* 3/2008 Khetawat et al. .......... 455/435.1
2008/0084993 A1 4/2008 Peddireddy et al.
2009/0055736 A1 2/2009 Yoon
2009/0075646 A1 3/2009 Lohlein et al.
2009/0098867 A1 4/2009 Varanda
2009/0150218 A1 6/2009 Brunner et al.
2009/0168660 A1 7/2009 Bhatia et al.
2009/0191857 A1 7/2009 Horn et al.
2010/0010922 A1 1/2010 Foottit et al.
2010/0056114 A1* 3/2010 Roundtree et al. ......... 455/414.1
2010/0125495 A1 5/2010 Smith et al.
2010/0159902 A1* 6/2010 Roundtree et al. ......... 455/414.1
2010/0192062 A1 7/2010 Anwar
2010/0248690 A1* 9/2010 Biggs et al. .................. 455/411
2010/0273456 A1 10/2010 Wolovitz et al.
2010/0278056 A1 11/2010 Meloche et al.
2010/0332072 A1* 12/2010 Ishiko et al. .................... 701/30
2012/0004974 A1* 1/2012 Burger et al. ............. 705/14.27
2012/0028620 A1* 2/2012 Roundtree et al. ......... 455/414.1
2012/0101952 A1* 4/2012 Raleigh et al. ................ 705/304

OTHER PUBLICATIONS

Final Office Action from corresponding U.S. Appl. No. 13/267,377 dated Sep. 3, 2013.

Notice of Allowance from a corresponding U.S. Appl. No. 12/387,962 dated Nov. 20, 2012.

Office Action from corresponding U.S. Appl. No. 13/766,622 dated Jul. 30, 2013.

Notification of Transmittal of the International Search Report and the Written Opinion of the International Searching Authority, or the Declaration from corresponding PCT application No. PCT/US/12/43192 dated Oct. 4, 2012.

Office Action dated May 30, 2014 from corresponding U.S. Appl. No. 13/267,379.

* cited by examiner

DEPLOYMENT MODEL

NETWORK INTEGRATION

MY ACCOUNT FLOW

FIG. 12
DEALS FLOW WITH "TELL A FRIEND"

DIAGNOSTICS HELP FLOW

CONTEXTUAL HELP FLOW

USAGE ALERT

ROAMING ALERT

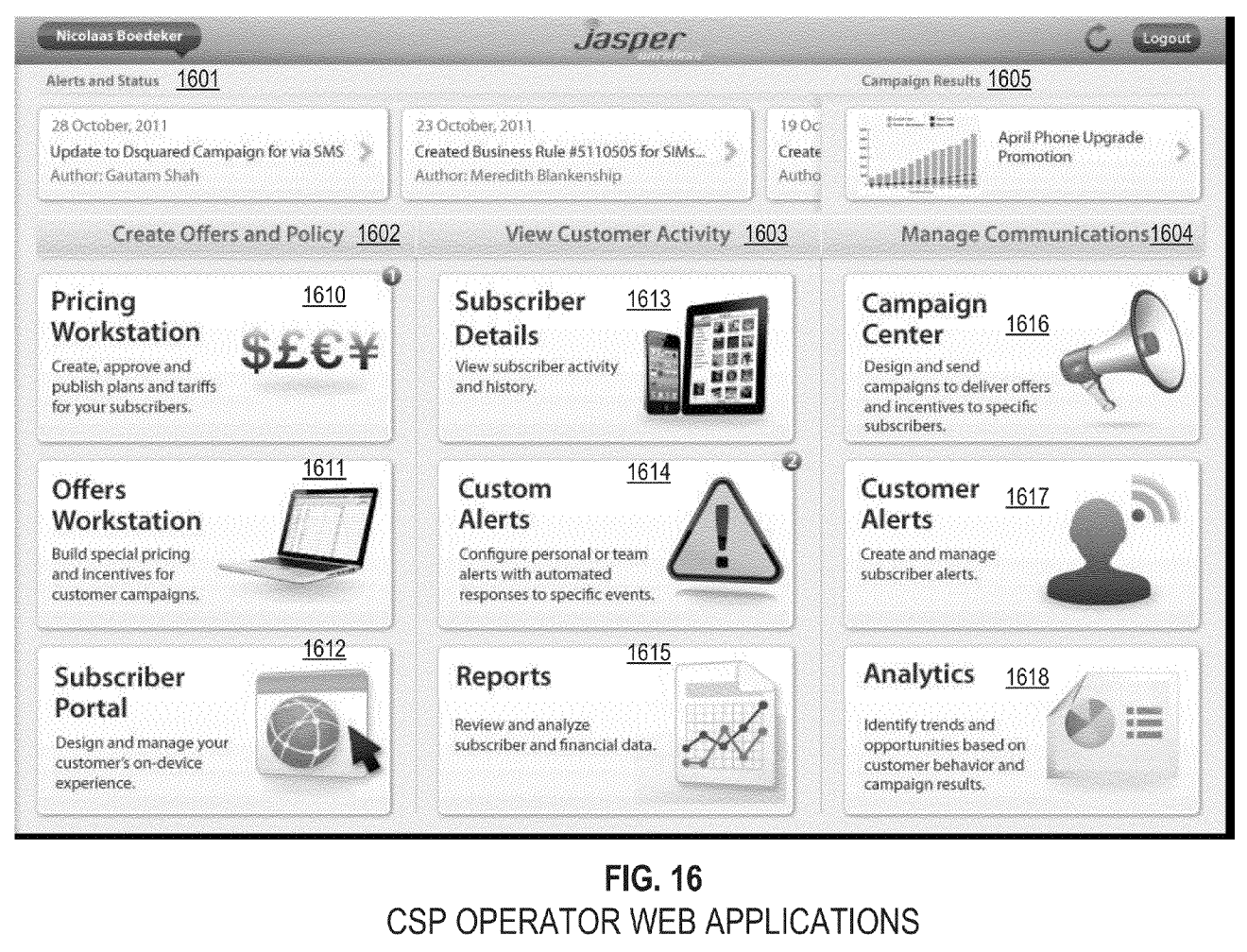

Nicolaas Boedeker
jasper
Logout

Alerts and Status 1601

28 October, 2011
Update to Dsquared Campaign for via SMS
Author: Gautam Shah

23 October, 2011
Created Business Rule #5110505 for SIMs...
Author: Meredith Blankenship Campaign Results 1605

April Phone Upgrade Promotion

Create Offers and Policy 1602

View Customer Activity 1603

Manage Communications 1604

Pricing Workstation 1610
Create, approve and publish plans and tariffs for your subscribers.

Subscriber Details 1613
View subscriber activity and history.

Campaign Center 1616
Design and send campaigns to deliver offers and incentives to specific subscribers.

Offers Workstation 1611
Build special pricing and incentives for customer campaigns.

Custom Alerts 1614
Configure personal or team alerts with automated responses to specific events.

Customer Alerts 1617
Create and manage subscriber alerts.

Subscriber Portal 1612
Design and manage your customer's on-device experience.

Reports 1615
Review and analyze subscriber and financial data.

Analytics 1618
Identify trends and opportunities based on customer behavior and campaign results.

FIG. 16
CSP OPERATOR WEB APPLICATIONS

CRM INTEGRATION

PUBLISHING OFFER/POLICY FROM CSP TO OPERATOR

PROVISIONING INTEGRATION

PROVISIONING INTEGRATION

BILLING INTEGRATION

REPORTING INTEGRATION

CORE SERVICES PLATFORM FOR WIRELESS VOICE, DATA AND MESSAGING NETWORK SERVICES

CROSS-REFERENCE TO RELATED APPLICATIONS

This application is a continuation-in-part of co-pending U.S. patent application Ser. No. 12/387,962 entitled VIRTUAL DIAGNOSTIC SYSTEM FOR WIRELESS COMMUNICATIONS NETWORK filed May 7, 2009, and is a continuation-in-part of co-pending U.S. patent application Ser. No. 12/652,694 entitled SYSTEM AND METHOD FOR CONNECTING CONFIGURING AND TESTING NEW WIRELESS DEVICES AND APPLICATIONS filed Jan. 5, 2010. This application is also based upon and claims the benefit of priority for prior Provisional Patent Application No. 61/501,131, filed on Jun. 24, 2011, the entire contents of which are incorporated herein by reference.

FIELD OF THE INVENTION

Embodiments of the invention relate to services provided to consumers and operators of wireless networks.

BACKGROUND

The continued evolution of wireless network technology allows consumers today to communicate with each other by voice, data and text messaging through highly sophisticated network architectures. A consumer can make a phone call, download data and send text messages using a single wireless communication device, such as a smartphone. Typically, a consumer would purchase a plan from a network operator and be constrained by the rules defined in the plan for the duration of the plan period. For example, if the plan's policy does not allow roaming outside of a predetermined region, the consumer would be unable to make any calls from his smartphone once he leaves that region. The consumer may be unaware of the cause of the problem, and cannot easily find help at a time when he cannot make phone calls. As another example, if the plan has a set quota for data usage and the consumer has reached a predetermined threshold (e.g., 90%) of that quota before the end of a billing cycle, the consumer's future data traffic can be throttled (e.g., the Quality of Service (QoS) is lowered) until the next billing cycle starts. With the conventional operator's system, a consumer cannot easily monitor his data usage and cannot easily request his QoS be maintained at the same level throughout a billing cycle. Thus, the conventional operator's system for managing usage, offers, pricing and policy is inflexible and cannot easily adapt to consumers' needs.

BRIEF DESCRIPTION OF THE DRAWINGS

The present invention is illustrated by way of example and not limitation in the figures of the accompanying drawings, in which like references indicate similar elements and in which:

FIG. 12 is an embodiment of a display screen of a CDA that shows a "Tell a Friend" feature.

FIG. 16 is an embodiment of a display screen of CSP operator Web applications.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Figure 1:
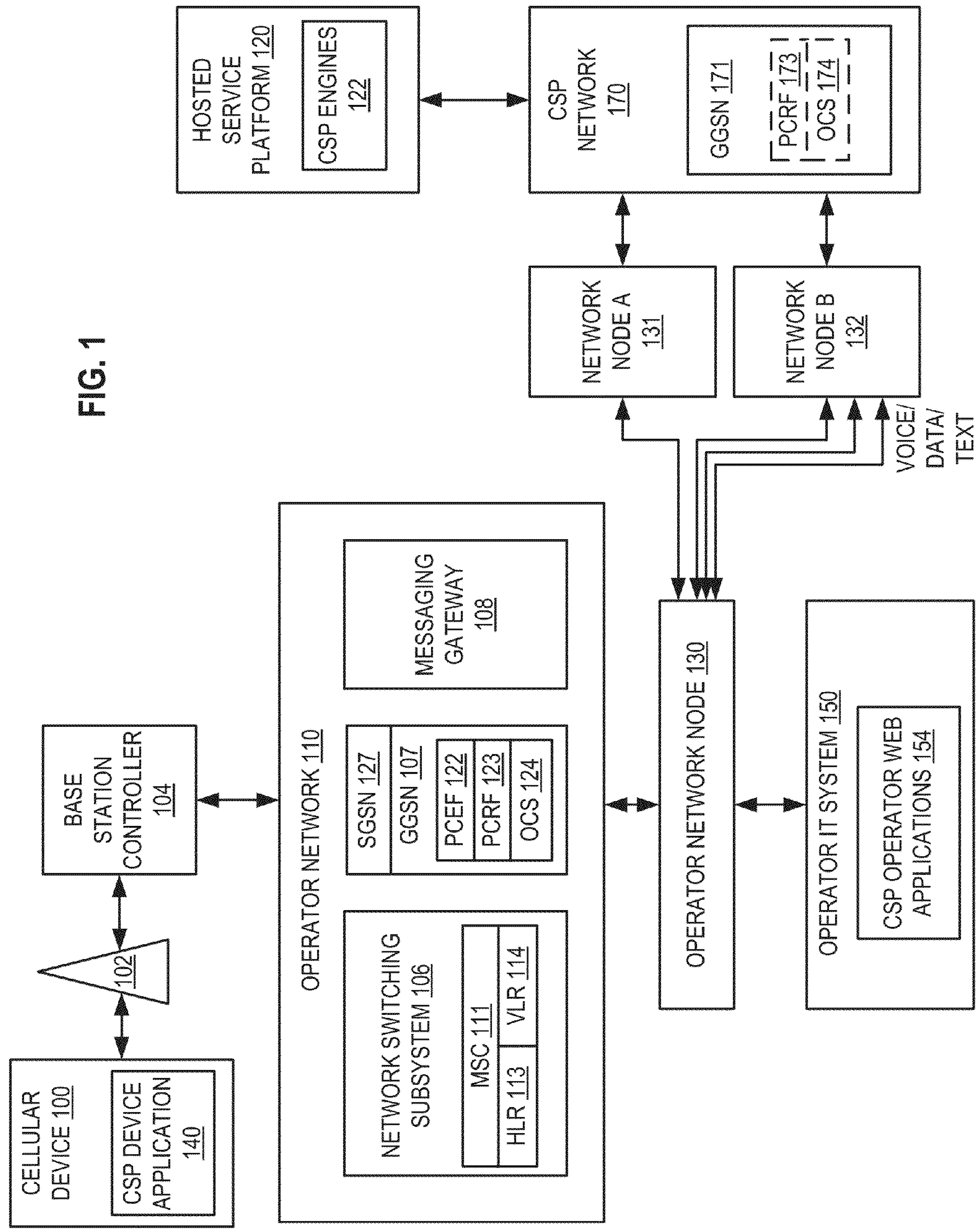
FIG. 1 is a diagram of one embodiment of network architecture in which a Core Service Platform (CSP) system may operate.

FIG. 1 is a block diagram illustrating an embodiment of a network system. In the embodiment shown, a cellular device 100 communicates with an operator network 110 through a base station 102 and a base station controller 104. Cellular device 100 can be a cellular telephone, a smartphone with data transfer and messaging capability, a tablet computer, a personal digital assistant (PDA), a video-camera, a gaming device, a global positioning system (GPS), an e-Reader, a Machine-to-Machine (M2M) device (i.e., an application-specific telemetry device that collects data using sensors and transmits the data to a destination such as a server over a network), a hybrid device with a combination of any of the above functionalities, or any other wireless mobile devices capable of sending and receiving voice, data and text messages. Cellular device 100 communicates with operator network 110 using wireless protocols, such as Bluetooth, IEEE 802.11-based wireless protocols (such as Wi-Fi), and the like.

Cellular device 100 is used by a consumer (equivalently, a subscriber or a user). Operator network 110 is a wireless cellular network that includes a voice network (e.g., a global system for mobile communications (GSM) network), a data network (e.g., a general packet radio service (GPRS) network), and a messaging network (e.g., a short message service (SMS) network). It is understood that operator network 110 can include voice, data and messaging networks that are different from the GSM network, GPRS network and SMS network. In the embodiment shown, the voice network is represented by a network switching subsystem 106, the data network is represented by a Serving GPRS Support Node (SGSN) 127, a Gateway GPRS Support Node (GGSN) 107, and the messaging network is represented by a messaging gateway 108. It is understood that operator network 110 includes various other network components, which are omitted herein for simplicity of illustration. Operator network 110 allows a user of cellular device 100 to engage in voice, data and messaging communications with devices coupled to operator network 110 through external networks (not shown).

In one embodiment, base station 102 includes a radio transmitter and receiver for communicating with cellular devices (e.g., cellular device 100), and a communications system for communicating with base station controller 104. Base station controller 104 controls base station 102 and enables communication with operator network 110. In various embodiments, base station controller 104 can control any number of base stations.

Network switching subsystem 106 controls voice network switching, maintains a register of cellular device locations, and connects operator network 110 with an external voice network, such as a public switched telephone network, a private voice telephony network, or any other appropriate voice telephony network. In one embodiment, network switching subsystem 106 includes a mobile switching center (MSC) 111, a home location register (HLR) 113, and a visitor location register (VLR) 114. MSC 111 controls, sets up and releases a voice connection using signaling protocols such as signaling system No. 7 (SS7). In some embodiments, MSC 111 additionally tracks the time of a voice connection for the purposes of charging cellular devices, decrementing available usage, tracking monetary balance, monitoring battery status, and other purposes. In one embodiment, operator network 110 may include any number of MSCs. Each of these MSCs serves cellular devices within a network area, which may include one or more base stations and one or more base station controllers. Some of the cellular devices may be registered to use this network area as their "home network," and some of the other cellular devices may be registered to use other network areas as their home networks. HLR 113 maintains a list of cellular devices whose home network is served by MSC 111. VLR 114 maintains a list of cellular devices that have roamed into the area served by MSC 111. When a cellular device leaves its home network (e.g., the network area served by MSC 111), the VLR ("target VLR") of the network ("target network") to which the device has roamed communicates with HLR 113 in the home network of the device. When HLR 113 has confirmed to the target VLR that it can allow the device to use the target network, the device is added to the target VLR, and the MSC in the target network sets up the communication for the roaming cellular device.

SGSN 127 and GGSN 102 are two of the main components in the core data network of operator network 110. SGSN 127 is responsible for the delivery of data packets from and to the cellular devices within its geographical service area. The tasks of SGSN 127 include packet routing and transfer, mobility management (attach/detach and location management), logical link management, authentication and charging functions. GGSN 107 controls data communications switching and connects operator network 110 with an external data network, such as a local area network, a wide area network, a wired network, a wireless network, the Internet, a fiber network, a storage area network, or any other appropriate networks. In some embodiments, GGSN 107 is one of the core components in the core data network of operator network 110. Although not shown in FIG. 1, the core data network of operator network 110 may also include various other network switching components. GGSN 107 serves as an interface between operator network 110 and external data networks, and translates data packets into the appropriate formats for the devices on each side. In the embodiment shown, GGSN 107 also performs policy and charging enforcement and control via the functionalities of: Policy and Charging Enforcement Function (PCEF) 122, Policy and Charging Rules Function (PCRF) 123 and Online Charging System (OCS) 124. PCRF 123 performs policy control and flow-based charging control. To that end, PCRF 123 authorizes Quality of Service (QoS) resources and operations, e.g., service redirection and other policy-based actions. Ultimately, PCRF 123 resembles a collection controller in that it collects the subscriber's subscription data and allows PCEF 122 to enforce the policies and the charging. OCS 124 facilitates the online charging process by collecting charging information about network resource usage concurrently with that resource usage. OCS 124 also approves authorization for the network resource usage prior to the actual commencement of that usage. The approval may be limited in terms of data volume or in terms of duration. PCEF 122 performs policy enforcement, service data flow detection, and flow-based charging functionalities. The policy control indicated by the PCRF 123 is enforced by PCEF 122. To that end, the PCEF 122 will permit the service data flow to pass through PCEF 122 only if there is a corresponding active Policy and Charging Control (PCC) rule and if OCS 124 has authorized credit for the charging key used for online charging. Ultimately, PCEF 122 ensures that service is provided with the appropriate QoS and that the subscriber is charged in accordance with the charging rate set for the subscriber.

Messaging gateway 108 provides short messages transit between cellular devices and other communication devices. Messaging gateway 108 can be a Short Message Service Center (SMSC), a multi-media messaging center (MMSC), or a network node coupled to the SMSC or MMSC. Messaging gateway 108 delivers text messages through operator network 110 to/from external networks via standard protocols such as Short Message Peer-to-Peer Protocol (SMPP) or Universal Computer Protocol (UCP).

In some embodiments, operator network 110 is coupled to a hosted service platform 120 via a Core Service Platform (CSP) network 170 and a number of network nodes. Hosted service platform 120 serves as a service management platform for wireless communication devices such as cellular device 100. Hosted service platform 120 may include multiple data centers in multiple geographical locations with each data center including multiple server computers. Hosted service platform 120 includes a number of CSP engines 122 that provide a suite of functions to automate both the sales and support processes towards wireless users. Hosted service platform and CSP network 170, as well as software hosted thereon, form a CSP system. An overview of the CSP system will be described below in connection with FIGS. 5 and 6.

CSP network 170 provides connections between the data centers in the hosted service platform 120 and operator network 110. In one embodiment, CSP network 170 includes a GGSN 171 that implements PCRF 173 and OCS 174. Depending on the agreements between the operator/owner of operator network 110 and operator/owner of CSP network 170, both sets of (PCRF 123, OCS 124) and (PCRF 173, OCS 174) can be active at the same time or at different stages of service deployment. In some alternative embodiments, CSP network 170 does not implement PCRF 173 and OCS 174. Instead, host service platform 120 collects subscription data, policy and charging information from operator network 110.

The network nodes between operator network 110 and CSP network 170 are represented in FIG. 1 as operator network node 130, network node A 131 and network node B 132. These network nodes (130, 131 and 132) can include switches, routers, bridges, and other network components. There can be any number of network nodes between operator network 110 and CSP network 170. In the embodiment shown, operator network node 130 communicates with network node A 131 via an integrated connection, while it communicates with network node B 132 via three separate connections for voice, data and text messaging.

In some embodiments, an operator IT system 150 is coupled to operator network 110 via operator network node 130. Operator IT system 150 receives subscribers' data and usage from operator network 110, and provides the functions of Customer Relationship Management (CRM)/care, provisioning/order entry, billing/mediation (or payments), and reporting/data warehouse (DWH) (or business intelligence). Operator IT system 150 also provides a user interface (such as a desktop interface or a Web interface) for a system administrator to monitor and manage these functions. In one embodiment, operator IT system 150 includes a control center that hosts CSP operator Web applications 154. CSP operator Web applications 154 allow an operator to manage its marketing campaign, offers (equivalently, rate plans), pricing, billing and customer care in an integrated environment. Functionality of CSP operator Web applications 154 will be described later in further detail with reference to FIG. 16.

In some embodiments, cellular device 100 stores and runs CSP device application (CDA) 140. CDA 140 displays alerts and notifications to consumers in response to the consumers' current usage and condition, provides customized contextual offers in real time, and allows consumers to select and purchase wireless products and services from their devices. Moreover, using CDA 140, consumers can diagnose and solve their own service questions and problems directly from their wireless device. For example, CDA 140 can query multiple sources, including cellular device 100 itself, to perform a diagnosis. Functionality of CDA 140 will be described later in further detail with an example shown in FIGS. 10-15.

Figure 2:
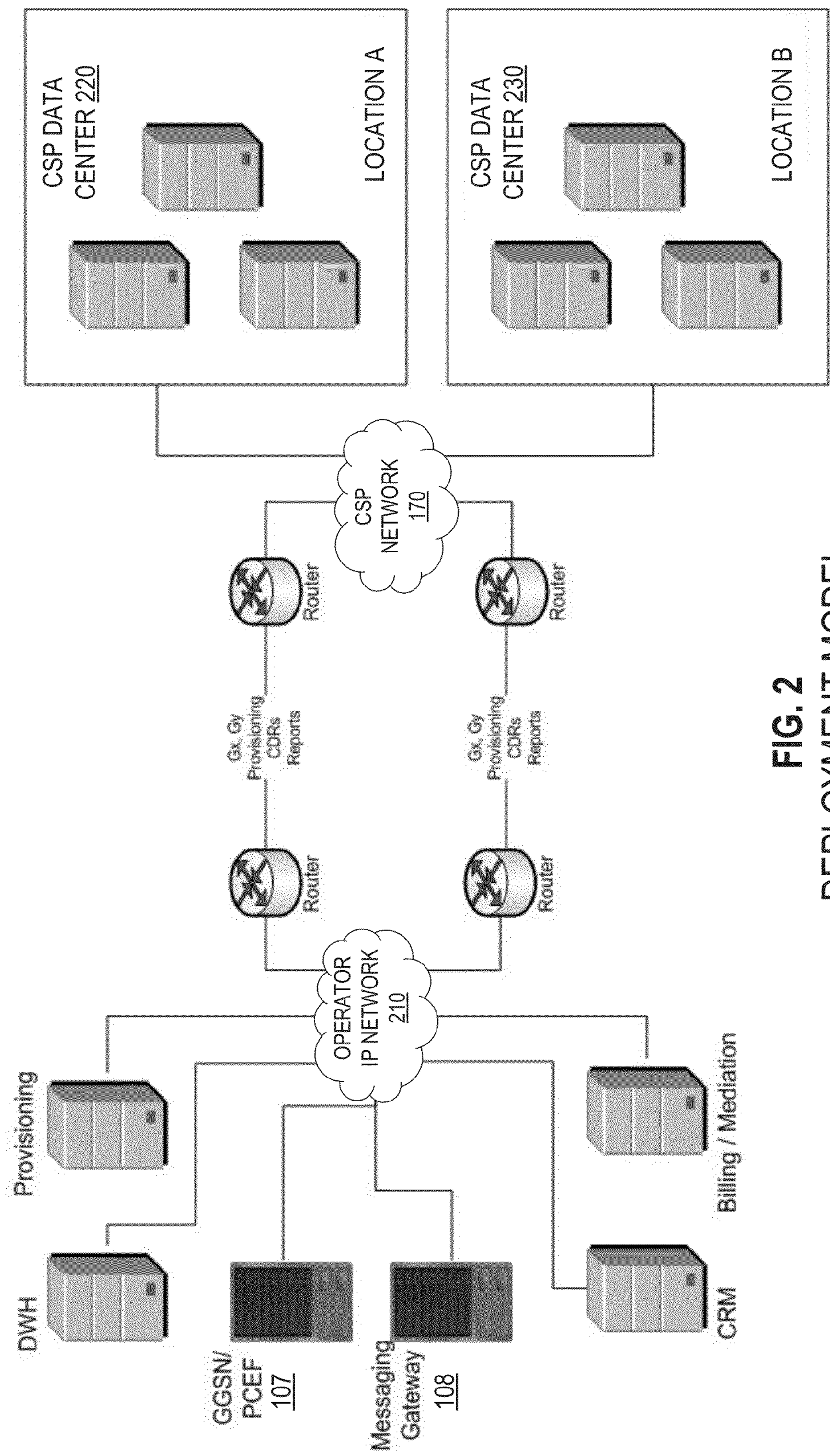
FIG. 2 is a diagram of one embodiment of a deployment model for a CSP system.

FIG. 2 is a diagram illustrating an embodiment of a deployment model for the CSP data centers. The CSP data centers can be a cloud-based computing system. In the embodiment shown, two data centers (220 and 230) are coupled to operator Internet Protocol (IP) network 210 via CSP network 170 and a number of network nodes (e.g., routers). Data centers 220 and 230 are part of hosted service platform 120 of FIG. 1. Data centers 220 and 230 can be deployed at different locations and each center includes multiple server computers. Some of the server computers can serve as Web servers providing resources that can be accessed by the operator and subscribers. Data centers 220 and 230 can be synchronized in real time, and either data center can carry the full service demand. In one embodiment, dynamic IP routing is established (e.g., Border Gateway Protocol (BGP)) between operator IP network 210 and data centers 220 and 230, such that failure of one path will allow for automatic routing via the alternative path.

It is understood that hosted service platform 120 of FIG. 1 can include any number of data centers in any geographical locations. Operator IP network 210 can be part of the data network of operator network 110 of FIG. 1. In the embodiment shown, operator IP network 210 interconnects GGSN 107, messaging gateway 108 and the systems of CRM, provisioning/order entry, billing/mediation, and data warehouse (DWH) in operator IT system 150 of FIG. 1. In one embodiment, operator IP network 210 and CSP network 170 exchange provisioning/order entry data, charging data records (CDRs), reports via standard 3$^{rd}$ Generation Partnership Product (3GPP) interfaces (Gx, Gy).

Figure 3:
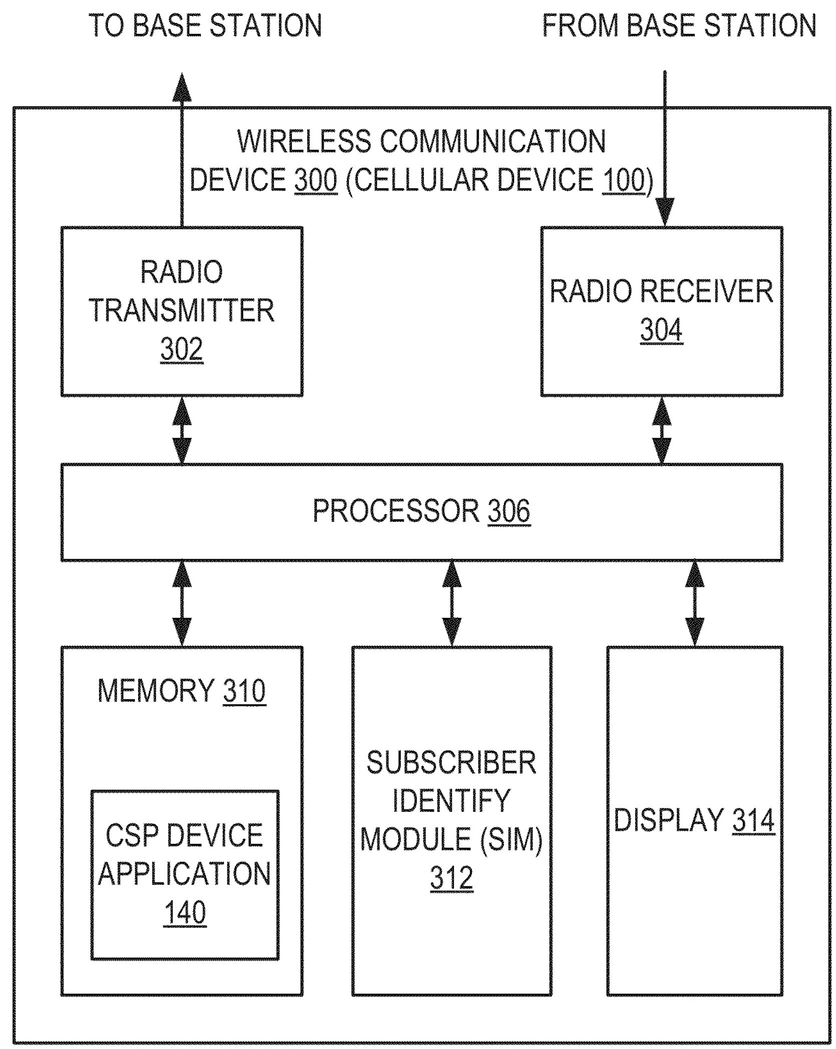
FIG. 3 is a diagram of one embodiment of a mobile communication device.

FIG. 3 is a block diagram illustrating an embodiment of a wireless communication device 300 (e.g., cellular device 100 of FIG. 1). In one embodiment, wireless communication device 300 is a smartphone. In alternative embodiments, wireless communication device 300 can be a cellular telephone, a tablet computer, a personal digital assistant (PDA), a video-camera, a gaming device, a global positioning system (GPS), an e-Reader, a Machine-to-Machine (M2M) device (i.e., an application-specific telemetry device that collects data using sensors and transmits the data to a destination such as a server over a network), a hybrid device with a combination of any of the above functionalities, or any other wireless mobile devices capable of sending and receiving voice, data and text messages. In the embodiment shown, wireless communication device 300 includes a radio transmitter 302, a radio receiver 304, a processor 306, memory 310, a subscriber identity module (SIM) 312, and a display 314. In some embodiments, SIM 312 is optional and the inclusion of SIM 312 is dependent on the network technology in use. Radio transmitter 302 and radio receiver 304 communicate with a base station (e.g., base station 102 of FIG. 1) using wireless radio communication protocols. In some embodiments, radio transmitter 302 and/or radio receiver 304 communicate voice signals, data signals, text signals (e.g., SMS), configuration and/or registration signals, or any other appropriate kinds of signals. Processor 306 executes instructions stored in memory 310 to control and perform the operations of wireless communication device 300. In some embodiments, memory 310 includes one or more of the following: read-only memory (ROM), flash memory, dynamic random access memory (DRAM), static memory and data storage device. Memory 310 can act as temporary and/or long-term information storage for processor 306. In one embodiment, memory 310 stores CDA 140. In one embodiment, display 314 can serve as a graphical user interface (GUI) that displays images and data, such as the screen displays of CDA 140. The displayed images and data can be retrieved from memory 310 or other local storage, or can be received through radio receiver 304 from a Web server (e.g., the Web servers in the CSP data centers).

In one embodiment, SIM 312 is a removable module storing an identifying number for wireless communication device 300 to identify the device to the network. In various embodiments, SIM 312 stores an International Mobile Subscriber Identity (IMSI) number, an Integrated Circuit Card Identifier (ICCID) number, a serial number, or any other appropriate identifying number.

Figure 4:
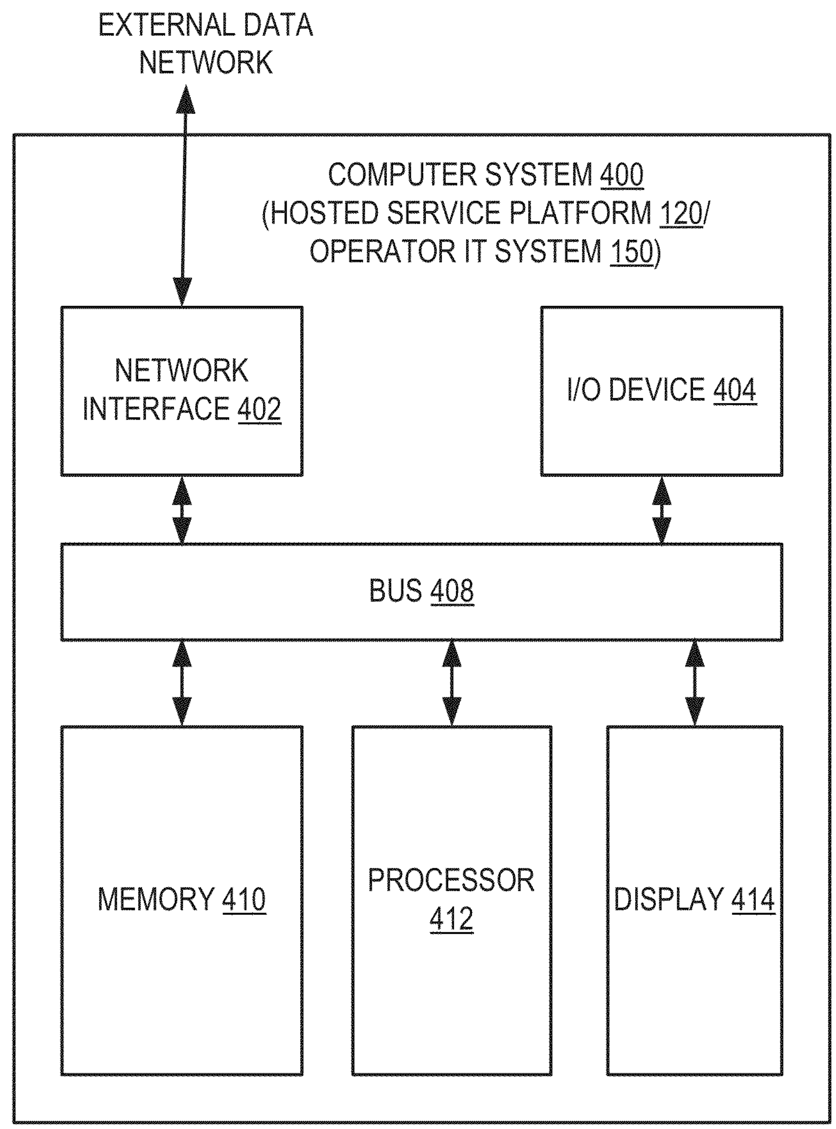
FIG. 4 is a diagram of one embodiment of a computer system.

FIG. 4 is a block diagram illustrating an embodiment of a computer system 400. In one embodiment, computer system 400 can be a server computer within hosted service platform 120 of FIG. 1. In another embodiment, computer system 400 can be a server computer within operator IT system 150 of FIG. 1. It is understood that hosted service platform 120 and operator IT system 150 can include any number of server computers. In the embodiment shown, computer system 400 includes a processor 412, memory 410, an I/O device 404, a network interface 402, a display 414 and a bus 408. In one embodiment, display 414 can serve as a graphical user interface (GUI) that displays graphics and data to an operator. Some of the displayed graphics and data can be retrieved from memory 410 or other local storage, or received through network interface 402 from a Web server. Processor 412 represents one or more general-purpose processing devices. Memory 410 includes one or more of the following: read-only memory (ROM), flash memory, dynamic random access memory (DRAM), static memory and data storage device. Network interface 402 communicates with an external data network. In an embodiment where computer system 400 is a server computer within hosted service platform 120 of FIG. 1, memory 410 stores software implementing one or more of the functions of CSP engines 122, PCRF 173 and/or OCS 174. In another embodiment where computer system 400 is a server computer within operator IT system 150 of FIG. 1, memory 310 stores software implementing one or more of the functions of CSP operator web applications 154.

Figure 5:
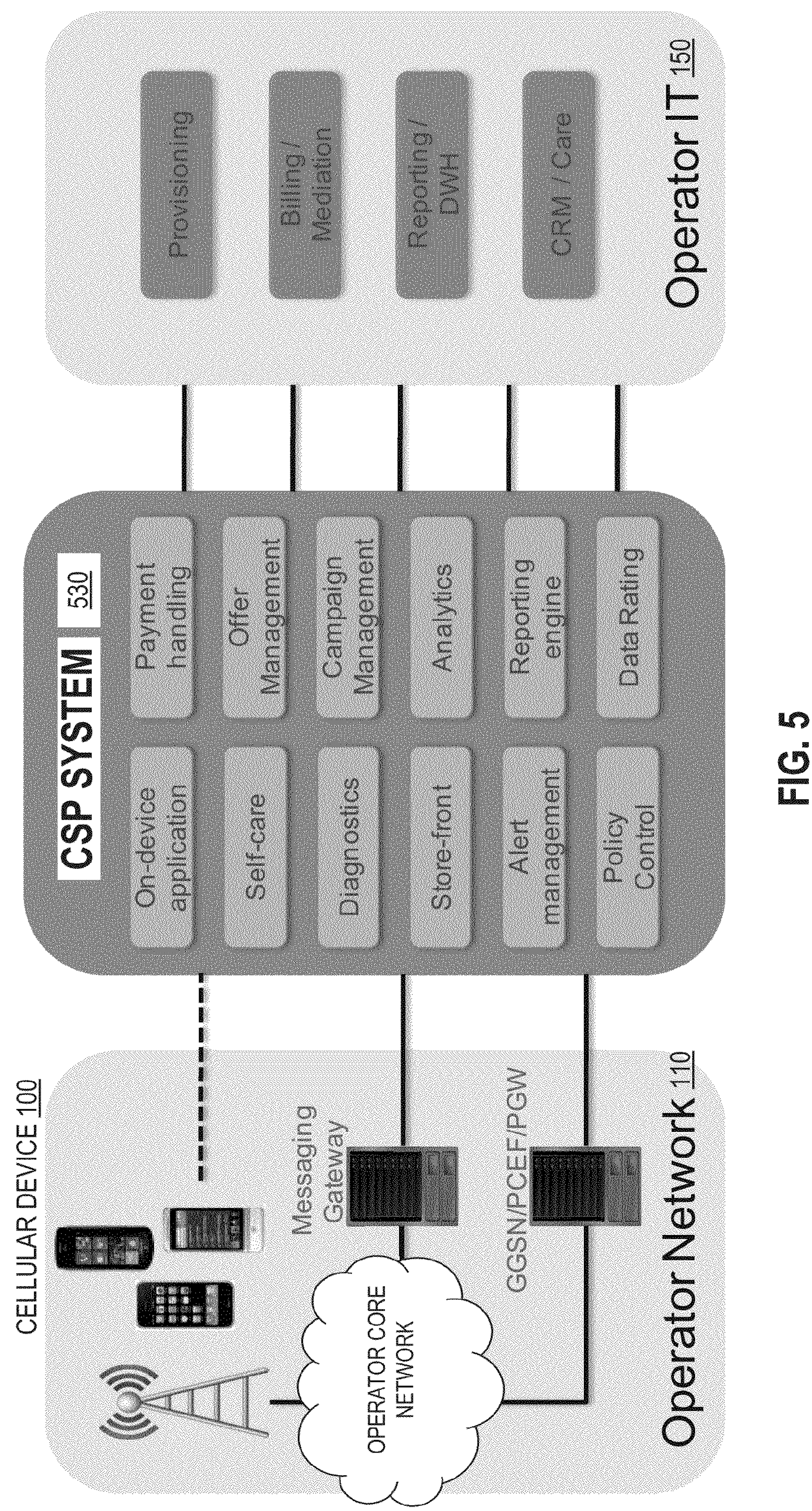
FIG. 5 is an overview of CSP system integration according to one embodiment of the invention.
Figure 6:
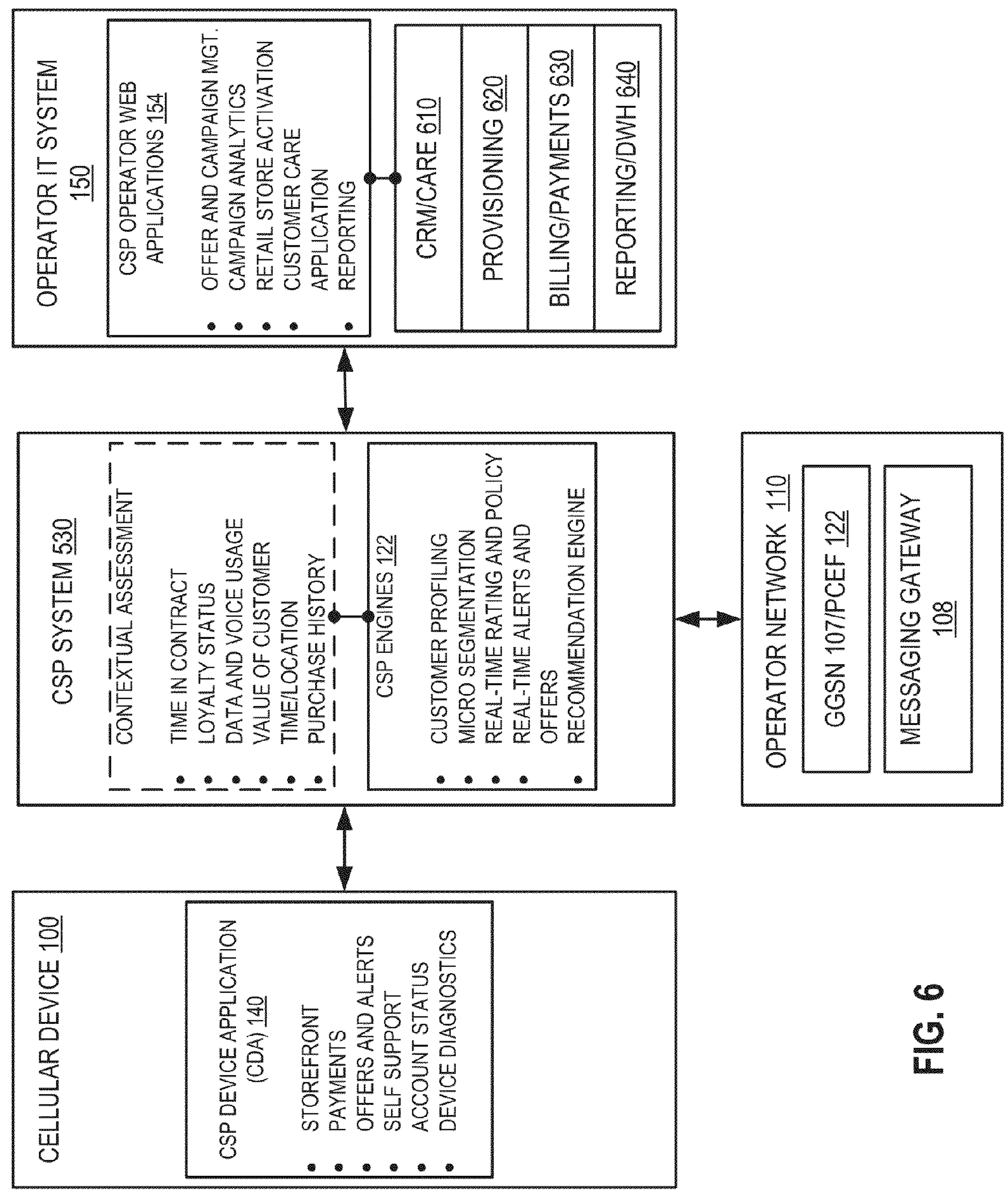
FIG. 6 is an overview with further details of CSP system integration according to one embodiment of the invention.

FIG. 5 is a block diagram illustrating an overview of CSP system integration according to one embodiment of the invention. FIG. 6 illustrates further details of CSP system integration according to one embodiment of the invention. In the following description, the term "CSP system" 530 refers to the software and hardware infrastructure that manages a suite of services provided to network operators and their subscribers. Thus, referring also to the embodiment shown in FIG. 1, CSP system 530 includes hosted service platform 120, CSP network 170, and the software hosted thereon. CSP system 530 interacts with operator network 110, operator IT system 150, and cellular device 100 in real time. In some embodiments, CSP system 530 can also interact with operator network 110, operator IT system 150, and cellular device 100 in batch mode. In one embodiment, CSP system 530 is a smartphone service management platform. Through CDA 140 and CSP operator Web applications 154, CSP system 530 provides or enables the functions of on-device application, self-care, diagnostics, store-front, alert management, policy control, payment handling, offer management, campaign management, analytics, reporting engine, and data rating.

Referring to FIG. 6, CSP system 530 provides customized contextual offers based on contextual assessments of a consumer's current "context." Such "context" includes, but is not limited to, time in contract, loyalty status, data and voice usage, value (or valuation) of customer, time (of a latest data request), location (of a latest data request) and purchase history. The contextual assessments can be made by CSP engines 122, which run on hosted service platform 120 of FIG. 1 and perform the functions that include, but are not limited to, customer profiling, micro-segmentation, real-time rating and policy, real-time alerts and offers, and targeted recommendations for offers and promotions. CSP system 530 is able to not only identify who the consumer is, but also the consumer's current context, in order to make the right offers at the right time. CSP system 530 formulates offers that the consumer is most likely to purchase and that are most valuable to the operator. The consumer can choose one of the offers and make the purchase from his device at the moment he most likely needs it to maintain his usage level. For example, if the consumer is in the middle of downloading a video to his smartphone and his data usage limit or threshold is reached, he can receive an alert on his smartphone with offers to add more megabytes of data to extend his usage limit. In one scenario where the consumer's usage limit or threshold has not been reached, he can also receive an offer to add more megabytes of data to improve the download speed. The consumer can make the purchase from this smartphone and continue the downloading with no or little noticeable interruption. In one embodiment, the offers can include top-up offers or plan changes, which add more megabytes of data or more usage time to a consumer's existing plan for the current billing cycle, or upgrades, which change the consumer's existing plan to a new plan that is not limited to the current billing cycle.

Consumers experience CSP system 530 through CDA 140 on their wireless communication devices. CDA 140 provides consumer-side functions that include, but are not limited to: storefront, payment, offers and alerts, self-support, account status, and device diagnostics. Operators experience CSP system 530 through CSP operator Web applications 154. CSP operator Web applications 154 provide operator-side functions that include, but are not limited to: offer and policy management, campaign and alert management, business and eligibility rules management, product catalog, customer relationship management, merchandising and content management, campaign analytics, retail store activation, customer care application, and reporting. For the operator, this CSP experience translates to the following three main benefits: (1) CSP system 530 provides a retail store on every wireless communication device, thereby increasing Average Revenue per User (ARPU) through real-time contextual selling; (2) CSP system 530 drives support cost towards zero by providing a self-support experience for consumers; and (3) CSP system 530 drives cost of sales towards zero using dedicated on-device channels.

In order to provide these benefits and reduce time to market, CSP system 530 integrates with four functions of operator IT system 150. The four functions are: CRM/care 610, provisioning/order entry 620, billing/payments 630 and reporting/DWH 640. CSP system 530 also integrates with two functions of operator network 110. The two functions are GGSN 107/PCEF 122 (which represents PCEF 122 implemented by GGSN 107) and Messaging Gateway 108.

The integration with operator network 110 will be described below with reference to FIGS. 7-9. The integration with wireless communication devices (e.g., cellular device 100) will be described below with reference to FIGS. 10-15. Finally, the integration with operator IT system 150 will be described below with reference to FIGS. 16-22.

CSP—Network Integration

As shown in the embodiment of FIG. 6, the integration with operator network 110 enables the ability of CSP system 530 to have real-time visibility of usage and take real-time actions. The two network functions with which CSP system 530 integrates are GGSN 107/PCEF 122 and messaging gateway 108.

The network integration enables fast time to market without compromising network integrity or service quality. In one embodiment, the integration is achieved through the use of standard 3GPP interfaces (Gx, Gy) and standard Short Message Peer-to-Peer (SMPP) interface.

Figure 7:
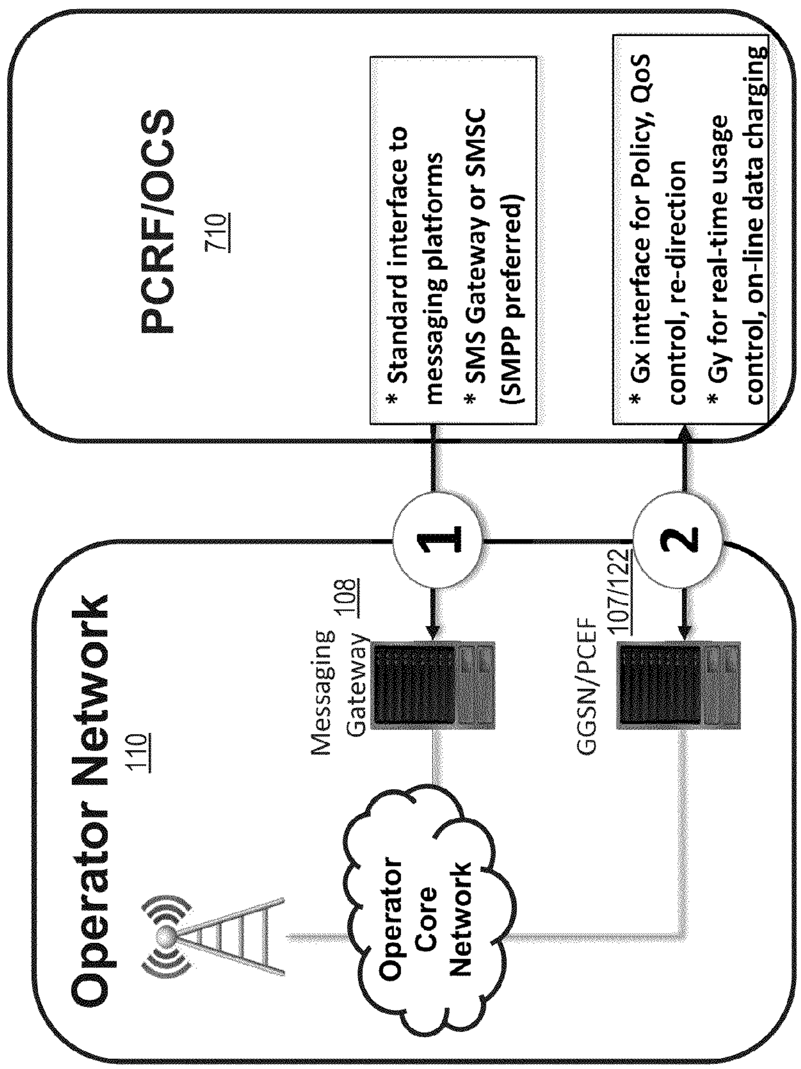
FIG. 7 is an embodiment of integration between a CSP system and an operator network.
Figure 8:
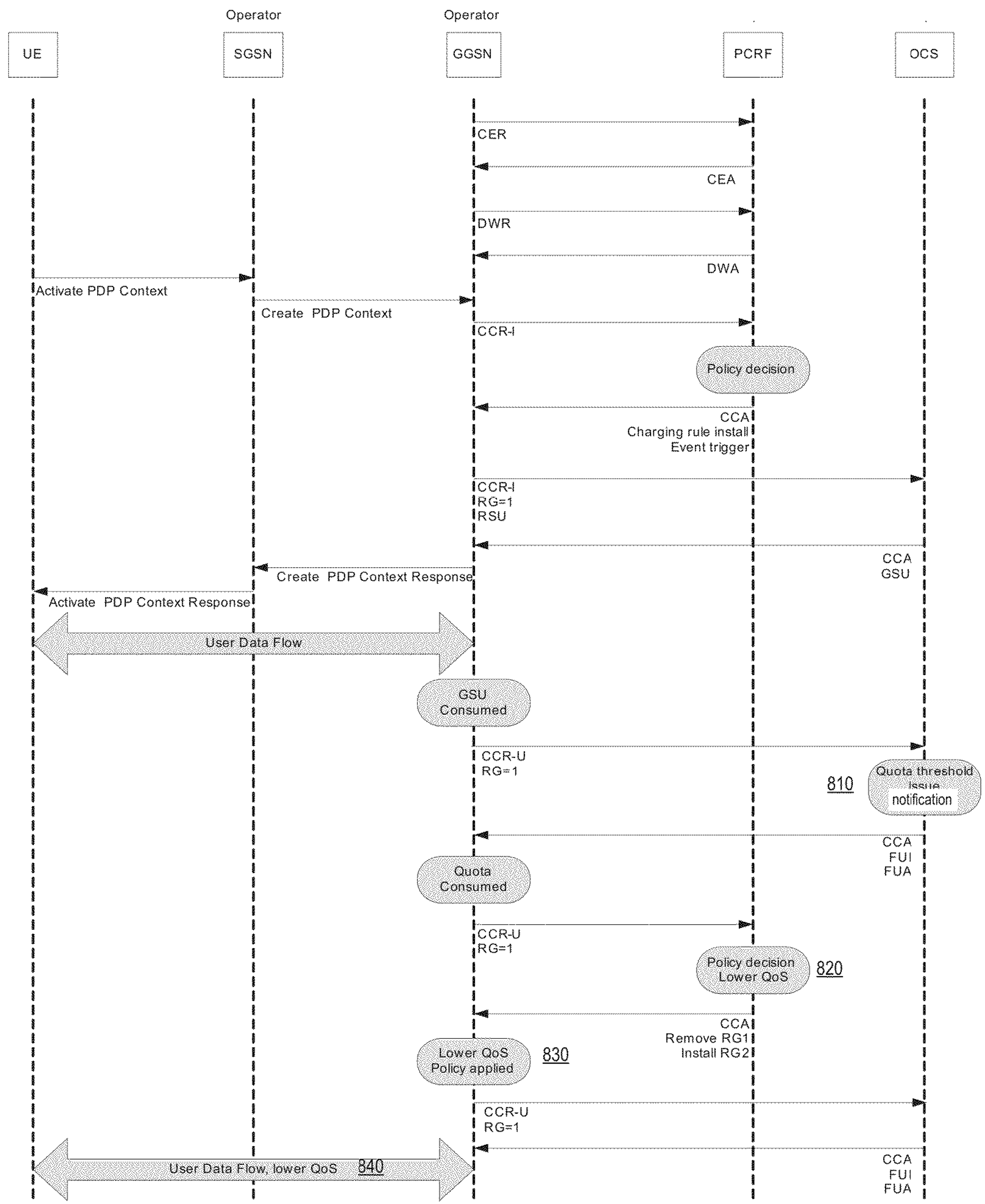
FIG. 8 is an embodiment of network signal flow.

FIG. 7 illustrates an embodiment of the interfaces between operator network 110 and PCRF/OCS 710. As described above in connection with FIG. 1, PCRF/OCS 710 may reside within CSP network 170 (e.g., PCRF 173 and OCS 174), within operator network 110 (e.g., PCRF 123 and OCS 124), or both. In the embodiment of FIG. 7, it is shown that PCRF/OCS 710 resides outside of operator network 110 (that is, within CSP network 170). However, if PCRF/OCS 710 resides within operator network 110, CSP network 170 can receive relevant information from operator network 110 in real time or near real time. The CSP functions, as described before in connection with FIGS. 5 and 6, can be embedded within PCRF/OCS 710. Thus, it is understood that the exact location of PCRF/OCS 710 is not germane to the disclosure herein.

Referring to FIG. 7, a standard interface exists between messaging gateway 108 and PCRF/OCS 710. Message gateway 108 can be a SMS gateway or a Short Message Service Center (SMSC). This interface to messaging gateway 108 can be a standard SMPP interface. This interface allows the system to deliver alerts or notifications to CDA 140 of FIG. 6 and user via SMS.

The (Gx, Gy) interfaces are defined in accordance with the Diameter protocol. The (Gx, Gy) interfaces are situated between GGSN 107/PCEF 122 and PCRF/OCS 710. More specifically, the Gx interface is between PCEF 122 and PCRF for policy, QoS control and re-direction. The Gy interface is between PCEF 122 and OCS for real-time usage control and online data charging.

The following describes a number of scenarios that illustrate the possible use cases in a network system with integrated operator network and CSP functions. Some of these use cases can be combined.

Case 1: Metering subscriber traffic with no overage allowed and no redirect to portal. In this scenario, a subscriber is assigned a monthly quota of X MB and a threshold is set at Y %. A notification is sent to the subscriber when the subscriber exceeds the usage threshold of Y %. No subsequent session is allowed. Quota is reset at the end of the billing cycle.

Case 2: Metering subscriber traffic with redirect to offer portal. In this scenario, a subscriber is assigned a static monthly quota of X MB and a threshold is set at Y %. A notification is sent to the subscriber when the subscriber exceeds the usage threshold of Y %. When the subscriber reaches 100% of the monthly quota, the subscriber session is redirected to a portal with specific offers. The subscriber selects a top-up offer and is allowed to continue passing traffic.

Case 3: Policy to throttle traffic at the end of usage quota. In one scenario, the subscriber can have unlimited usage at a lower speed with a monthly quota at a higher speed. After the monthly quota is consumed, the subscriber's data traffic is reduced (throttled) to the lower speed. In another scenario, a subscriber is assigned a static monthly quota of X MB and a threshold is set at Y %. A notification is sent to the subscriber when the subscriber exceeds the usage threshold of Y %. When the usage reaches 90% (or any configurable percentage) of the monthly quota, the subscriber's data traffic is reduced (throttled) to an externally specified speed (e.g., a speed specified by the operator of the network). When the subscriber reaches 100% of the monthly quota, the subscriber session is redirected to a portal with specific offers. The subscriber can select a top-up offer and be allowed to continue passing traffic at the original Quality of Service (QoS). The subscriber can also pay for a higher speed (e.g., "throttle up") if the subscriber is accessing a selected service (e.g., an online video) or wants more bandwidth to download a specified song or other type of file.

Case 4: Day pass. In this scenario, a subscriber is assigned a fixed duration pass. The subscriber maintains its session until expiration of the time quota, at which point the subscriber session gets disconnected. The subscriber is subsequently not able to reconnect until a new pass is purchased.

Case 5: Usage control around user data volume. In this scenario, a subscriber is assigned a static monthly quota of X MB and a threshold is set at Y %. The subscriber is also restricted to use no more than Z MB of data in a 30-minute sliding window. The subscriber is redirected to a portal if data volume exceeds this restriction. Redirect in this case is one-time only. If the subscriber declines a top-up offer, then the subscriber is reduced (throttled) to an externally specified speed (e.g., a speed specified by the operator of the network) until the 30-minute sliding window is over. (Note that the QoS restrictions are settable.)

Case 6: Usage restricted to specific Public Land Mobile Networks (PLMNs). This can be combined with other use cases. In this scenario, a subscriber is only allowed to use specific PLMNs. At some point, the subscriber leaves the allowed networks and camps on another network. The subscriber attempts to setup Packet Data Protocol (PDP) context and is blocked by PCRF. Notification is sent to subscriber to offer a targeted roaming package.

Case 7: Changed QoS on Radio Access Technology (RAT) Change. This use case assumes that the subscribers are allowed (whether as part of the plan or by explicit purchase) to have a specific QoS based on how they are connecting to the network. In one scenario, a subscriber has no QoS restrictions on the 3G network. At some point, the subscriber goes into an EDGE network. Subscriber gets reduced QoS while on the EDGE network. The subscriber is provided with unrestricted speed upon returning to the 3G network. This use case may be combined with other use cases.

Case 8: Subscriber has no quota limit within home network but has a 100 MB quota while roaming (redirect at end of roaming quota). In this scenario, a subscriber has no set quota while on the home network. The subscriber has a 100 MB quota for roaming. When the subscriber enters a roaming network, a notification update is sent to the subscriber to advise roaming usage. At some point, the subscriber exceeds roaming usage threshold (e.g. 90% of quota). A notification update is sent to the subscriber indicating that roaming limit has been reached. When the subscriber reaches 100% of the roaming quota, the subscriber session is redirected to a portal for additional roaming top-up offers. This use case can be extended to a scenario in which a local area is covered by a group of cellular sites (cells). When a subscriber moves from one cell to another, he is not roaming (switching between networks) but travelling (going to discrete areas in the same network). In one scenario, the subscriber has no set quota while in the home cell, but has a set quota for travelling to other cells.

Case 9: Detect a subscriber's access to a selected (type of) website or service. In this scenario, through the use of Deep Packet Inspection (DPI), the subscriber's access to a selected (type of) website or service can be detected. The subscriber needs to pay for the access to the selected (type of) website or service. This scenario is similar to another scenario where subscribers would be redirected if they go to a website or location not explicitly allowed and they need to pay for the access.

Integration with GGSN/PCEF. FIG. 8 illustrates an example of a signal flow for a use case in which a subscriber is throttled when his quota has been consumed. The signal flow between the GGSN/PCEF and PCRF, as well as between GGSN/PCEF and OCS (or its equivalent), are in accordance with the Diameter protocol. The Diameter protocol is an authentication, authorization and account protocol. The Diameter protocol defines a number of commands, such as capability exchange request (CER), capability exchange answer (CEA), device watchdog request (DWR), device watchdog answer (DWA), credit control request (CCR), credit control answer (CCA), etc. These commands are exchanged between the GGSN/PCEF and PCRF, as well as between GGSN/PCEF and OCS, to communicate policy decision, consumed quota, threshold limit reached, change of policy decision and change of QoS. FIG. 8 shows that when a threshold quota is reached, the OCS issues a notification (810), and when the quota is consumed, the PCRF makes the policy decision to lower the QoS (820). The GGSN/PCEF applies the policy decision (830), which lowers the QoS of the user data traffic (840). The signal flow of FIG. 8 does not show all of the Diameter parameter details for simplicity of illustration.

Figure 9:
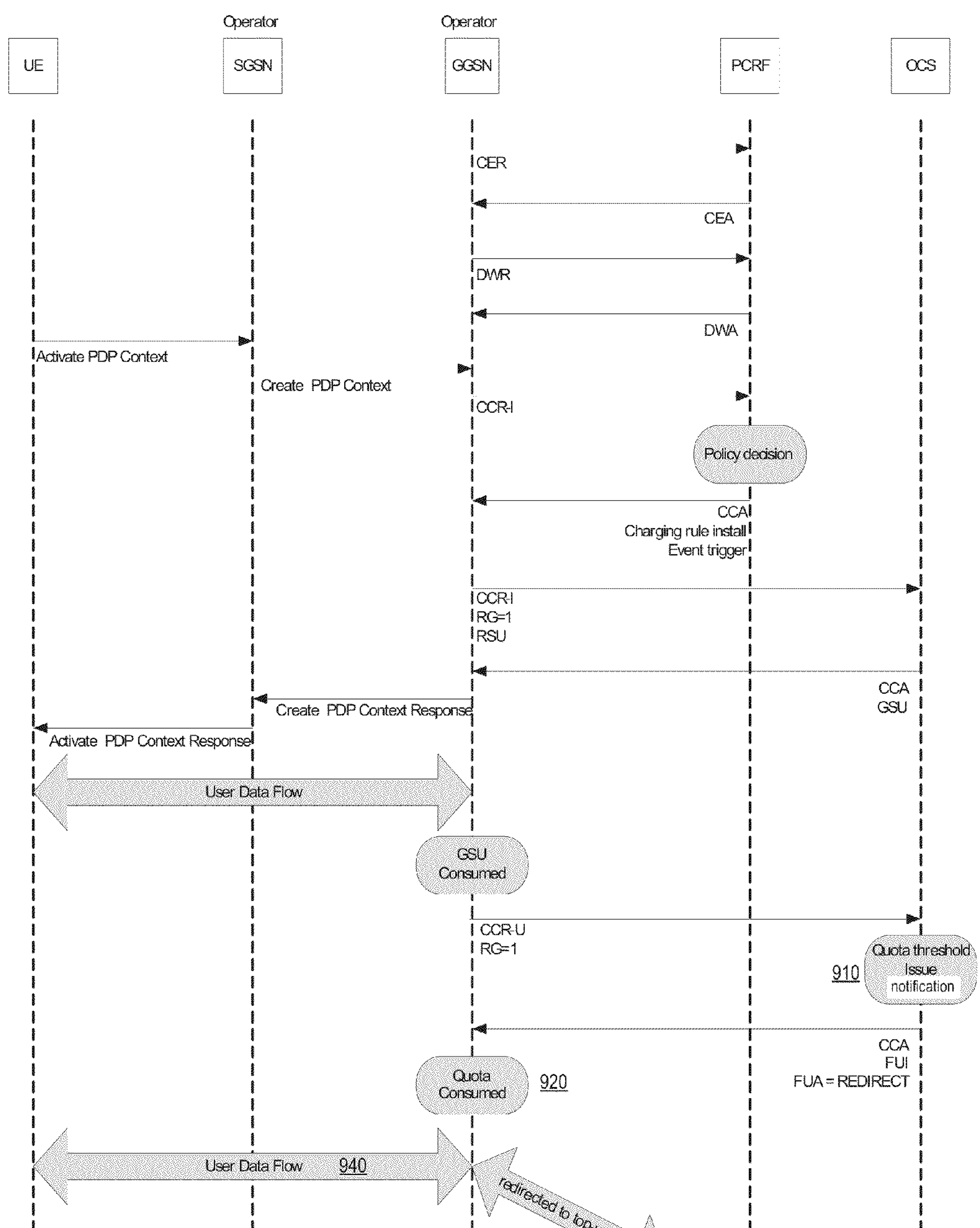
FIG. 9 is another embodiment of network signal flow.

FIG. 9 illustrates an example of a signal flow for a use case in which a subscriber is redirected to a top-up page when his quota has been consumed. FIG. 9 shows that when a threshold quota is reached, the OCS issues a notification (910). When the quota is consumed, the PCRF makes the policy decision to redirect the subscriber to a top-up page (920), and the GGSN/PCEF redirects the subscriber to the top-up page (930), and the user data traffic continues to flow (940). The signal flow of FIG. 9 does not show all of the Diameter parameter details for simplicity of illustration.

Because the various Diameter interfaces above have many options, the integration with one GGSN vendor may not be the same as the integration with another. For each make and model of GGSN and Packet Data Network Gateway (PGW), specific GGSN templates can be used. These specific templates include only the parameters and settings that have been proven against the corresponding make and model of GGSN. In terms of Diameter interfaces, only the Access Point Names (APNs) (i.e., the network addresses used to identify one or more GGSNs) that have been proven for the PCRF/OCS and the particular GGSN are used.

The CSP-integrated PCRF and OCS include an upwards-facing API (also referred to as northbound-facing) and Java Message Service (JMS) queue. These are used for passing usage information and event information to the higher layers of CSP system 530 (FIG. 6) and for issuing instructions from higher layers towards the PCRF and OCS. For example, a PCRF or equivalent instructs the GGSN/PCEF as to the QoS to be applied for a subscriber and the usage to be allowed. When the user has consumed a specific threshold, OCS or equivalent notifies the PCRF or equivalent, which in turn queries the recommendation engine to determine a recommendation to present in a notification and offer to the subscriber. If the user reaches 100% of his allocated quota, then OCS informs the policy and rating engine, which instructs the GGSN/PCEF to change the QoS to throttle the user.

The use of CSP-integrated PCRF and OCS allows for fast time to market and retains the full value proposition of the CSP solution. However, the higher-layer functions of CSP can integrate with any PCRF and OCS (e.g., an operator's own PCRF and OCS) that can provide the required interfaces for notification and control of the PCRF and OCS functions themselves.

As the PCRF and OCS may be tightly integrated with CSP system 530, when a user selects a new plan, that plan can be provisioned through the PCRF and OCS in real time. Thus, the subscriber can be served immediately. It is necessary that the other systems, such as customer care, within the IT infrastructure are aware of the new plan being provisioned. For that reason, as explained later, CSP system 530 interfaces to the operator's provisioning/order entry system. In one embodiment, CSP system 530 may manage the provisioning/order entry of data service upgrades with the CSP-integrated PCRF and OCS.

Integration with Messaging Gateway. CSP system 530 (FIG. 6) can communicate with CDA 140, as well as other devices if the operator so wishes, via a proprietary or non-proprietary IP-based communication protocol, such as SMS, Unstructured Supplementary Services Data (USSD), Apple® Push Notification Service (APNS) for iOS devices, Android® Cloud Device Messaging (ACDM) for Android® devices, and the like. SMS can be used to wake up CDA 140 when needed. For example, SMS can be sent to a consumer as an alert or notification when data usage limit is reached, payment is overdue, or a promotion relevant to the consumer is available. In one embodiment, the alert and notification can be generated by network elements (such as PCRF/OCS within either operator network 110 or CSP network 170), and delivered to the consumer's CDA 140 by CSP system 530. In a scenario where the operator wishes to recruit existing subscribers to the use of CDA 140, CSP system 530 can use SMS to signal these subscribers' devices with a link to download CDA 140.

In some embodiments, operators have SMSCs to forward text messages to/from external systems. These SMSCs support protocols such as SMPP or UCP. Some operators also use messaging gateways as an interface to the external systems, thereby minimizing direct connections from external systems to the SMSCs. These gateways also support SMPP or UCP, and most also have other APIs that can be made available. In alternative embodiments, the SMSCs may be part of CSP system 530.

In some embodiments, CSP system 530 has built-in SMPP client functionality. CSP system 530 can integrate with the operator's messaging gateway 108 using SMPP. In one embodiment, a specific short code can be assigned to CSP system 530 and that short code is zero-rated. Thus, messages between CSP system 530 and the user device will not be charged to the user's account.

CSP—Application Integration on a Wireless Communication Device

Figure 10:
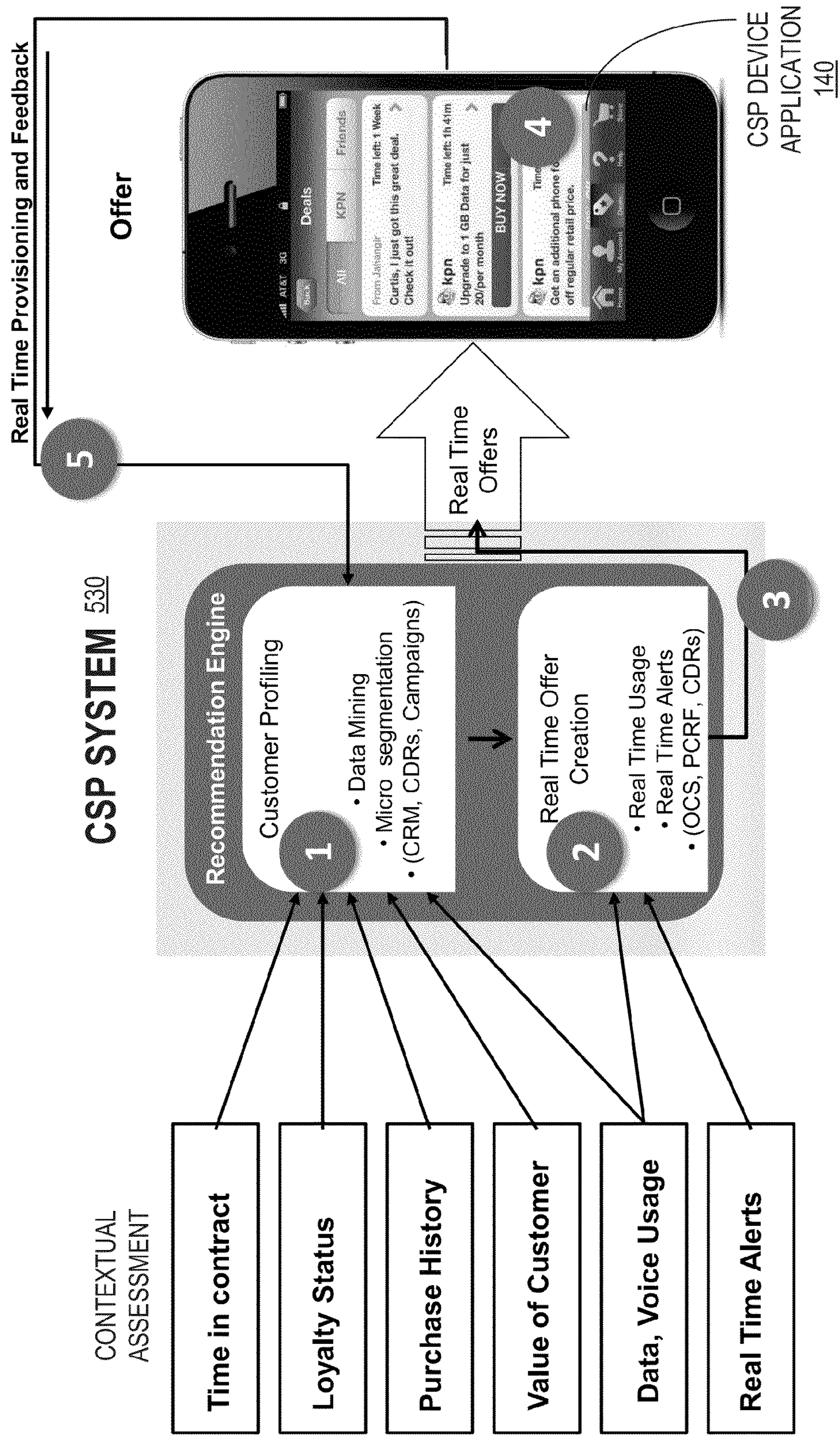
FIG. 10 is an embodiment of integration between a CSP system and a wireless communication device.

FIG. 10 illustrates an example of CSP device application (CDA) 140 when used on a smartphone device. Although a smartphone is shown, it is understood that CDA 140 can be run on cellular device 100 (FIG. 1) such as a cellular telephone, a tablet computer, a personal digital assistant (PDA), a video-camera, a gaming device, a global positioning system (GPS), an e-Reader, a Machine-to-Machine (M2M) device (i.e., an application-specific telemetry device that collects data using sensors and transmits the data to a destination such as a server over a network), a hybrid device with a combination of any of the above functionalities, or any other wireless mobile devices capable of sending and receiving voice, data and text messages. CDA 140 serves as an interface between the operator and the customer. CDA 140 receives information from CSP system 530. CSP system 530, in turn, receives the information from operator network 110, operator IT system 150, and CSP network 170 (FIG. 1). CDA 140 can be operator branded and can be built using a combination of multiple programming languages for Web and Mobile technologies, e.g. C++, HTML5, Java, OS-specific native application code, etc., and other mobile Web technologies. CDA 140 is an application (or construct) that is resident and accessed from the device. Customers can be given access to the application in several ways; e.g., by pre-loading on new customer devices at the device OEM, by downloading to existing devices using a link to the appropriate application store, and/or accessed via a mobile Web page sent to the customer.

While CDA 140 is a device-based application, a majority of its data and experience (e.g., displayed layout and content) are generated and served from CSP system 530. This provides the ability to dynamically display and change elements of the experience without pushing application updates to the user device. In one embodiment, CDA 140 communicates with CSP system 530 over Hyper-Text Transfer Protocol Secure (HTTPS), which uses multi-layer authentication architecture to validate CDA 140, handset and user, before allowing access to data and functions such as purchasing upgrades. Alerts and notifications may be delivered to the user device via SMS through the CSP-Messaging integration described above, as well as through Mobile OS-specific notification methods; e.g., APNS for iOS devices and ACDM for Android® devices.

In one embodiment, the recommendation engine (which is one of CSP engines 122 in CSP system 530 shown in FIG. 6) is the CSP's mechanism for creating real-time contextual offers. In the embodiment shown, the recommendation engine analyzes the information collected from CRM, CDRs, campaigns, and the like by data mining and micro-segmentation. The customer micro-segmentation allows an operator to target a certain segment of the subscribers to make offers that are most relevant to those subscribers. The recommendation can be made with respect to a number of factors of contextual assessment, such as time in contract, loyalty status, purchase history, value of customer, and data and time usage. The recommendation engine creates or recommends real-time offers based on results of customer profiling, as well as factors of the contextual assessment and information received from PCRF, OCS and CDRs. Thus, when a consumer's real-time usage reaches a limit and receives a real-time alert, the offers that are created by the recommendation engine and approved by the operator can be delivered to the user device instantly. CDA 140 directly interacts with CSP system 530. Via CDA 140, a consumer can choose one of the offered options that are displayed on his device in a user-friendly format. The chosen option can be provisioned to the user in real time and feedback can be sent back to hosted service platform 120 in real time.

Figure 11:
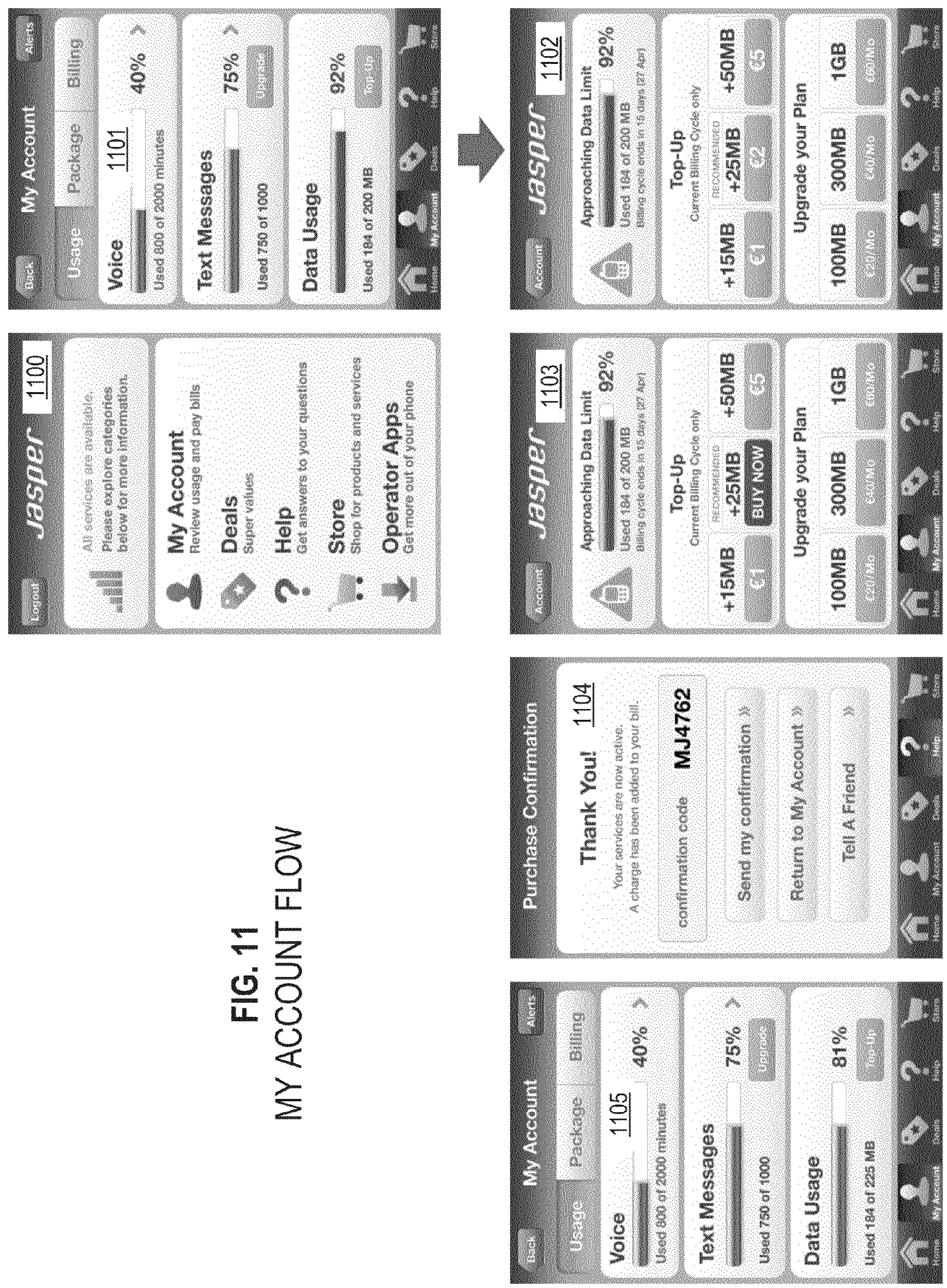
FIG. 11 is an embodiment of a display screen of a CSP device application (CDA) that shows a "My Account" feature.

FIGS. 11-15 illustrate examples of the functions provided by CDA 140 according to embodiments of the invention. Referring to FIG. 11, a series of screen displays of CDA 140 is shown in connection with a top-up offer for data usage. Initially, a home page (1100) provides a number of options, one of which is "My Account." By selecting the usage tab in the My Account page, the user's usage for voice, text message and data is displayed on the user device (1101). The display shows the user's data usage is at 92% of the quota limit. Automatically or by user's selection, a top-up offer page (1102) including multiple options is shown to the user. Each option is an offer created by the recommendation engine based on the contextual assessment described in connection with FIG. 6, and approved by the operator. If the user selects one of the options (1103), a purchase confirmation page (1104) will be shown on the display. At that point, the usage page (1105) shows that the user's quota has been increased and the data usage is now at 81% of the quota limit.

The "My Account" feature allows a user to check his current usage information whenever he wants to. If the user does not take the initiative to check his current usage and limits, he can be notified by alerts of situations that can lower his QoS or disable his network connections. Alerts will be described with reference to FIGS. 15A and 15B.

In one embodiment, the "My Account" feature also allows a user to monitor the billing; e.g., the amount of money he spent on network services before receiving a billing statement. For example, if the user is roaming and incurring roaming charges, he can monitor the amount of roaming charges in his account by clicking on the "billing" tab on the top right corner.

Figure 12:
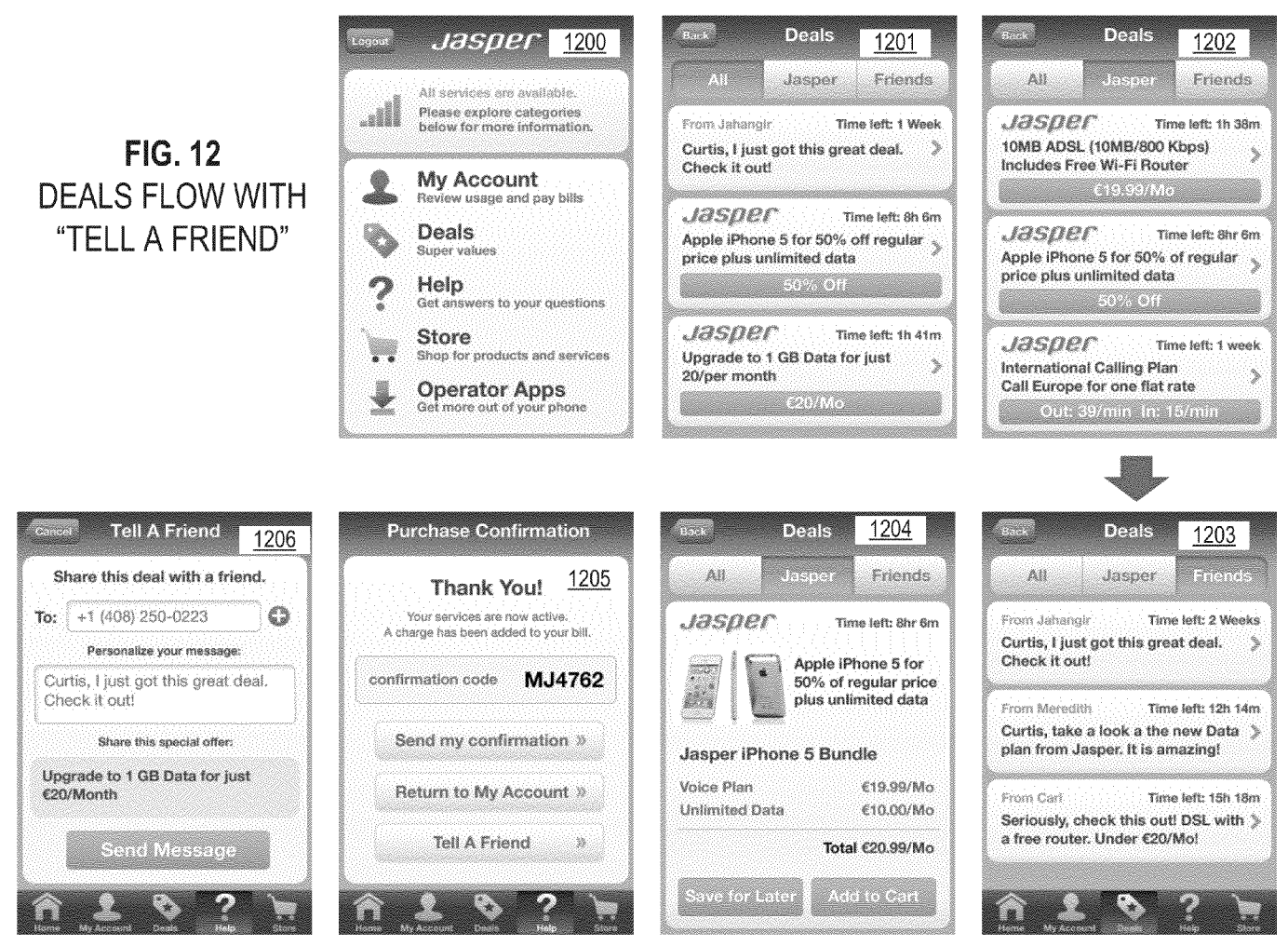

Referring to FIG. 12, a series of screen displays of CDA 140 is shown in connection with a "Tell-a-Friend" feature. Initially, a home page (1200) provides a number of options, one of which is "Deals." The Deals page (1201) shows all of the currently available deals relating to wireless communication services and devices. A user can select a tab to filter the displayed result; for example, deals offered by a particular provider, vendor or operator (1202). A user can select a "Friends" tab (1203) to show the deals recommended by his friends. By clicking into a particular offer (1204), the user can make a purchase in real time or save the offer for later consideration. A purchase confirmation page (1205) is displayed when the user makes a purchase. The user can share the information about this offer with his friend by clicking a soft button "Send Message" to send a generic or personalized message (1206).

Figure 13:
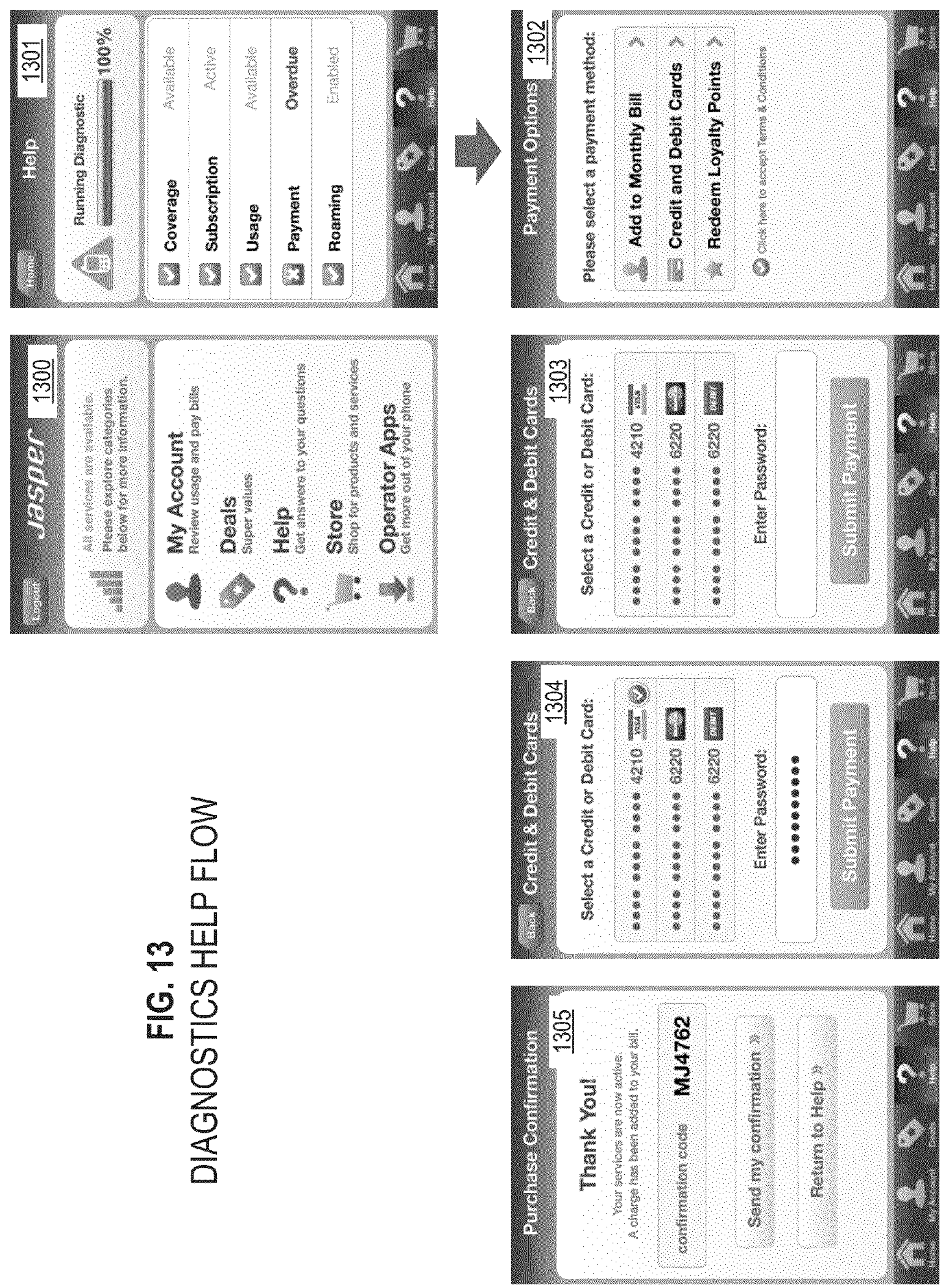
FIG. 13 is an embodiment of a display screen of a CDA that shows a "Diagnostic Help" feature.

Referring to FIG. 13, a series of screen displays of CDA 140 is shown in connection with a "Help" feature, which performs diagnosis and provides help. In one embodiment, the diagnosis is performed by the user's device, taking into account the information collected by CSP system 530 from many data sources (e.g., PCRF, OCS, CDRs, CRM, etc.). The diagnosis can be performed in the following areas: the user's coverage, subscription, usage, payment, roaming status, and the like. Initially, a home page (1300) shows that all services are currently available. A user can select a number of options, one of which is "Help," to explore more information. Clicking into the help page (1301) automatically activates a diagnostic function. In this example, the diagnostic function finds that the user's payment is overdue. By clicking on the diagnosed problem (payment), the user can go to a page displaying payment options (1302). The user can make payment by credit and debit cards (1303 and 1304). A purchase confirmation is shown after the payment is accepted (1305).

As shown in the example above, the "Help" feature not only discovers a problem, but also provides a resolution to the problem in a user-friendly way. In another scenario, a user may find out from the diagnosis that he does not have coverage. This diagnosed problem (coverage) can re-direct him to one or more proposed solutions, such as moving down the road 10 miles or purchasing an upgrade to the network coverage.

Figure 14:
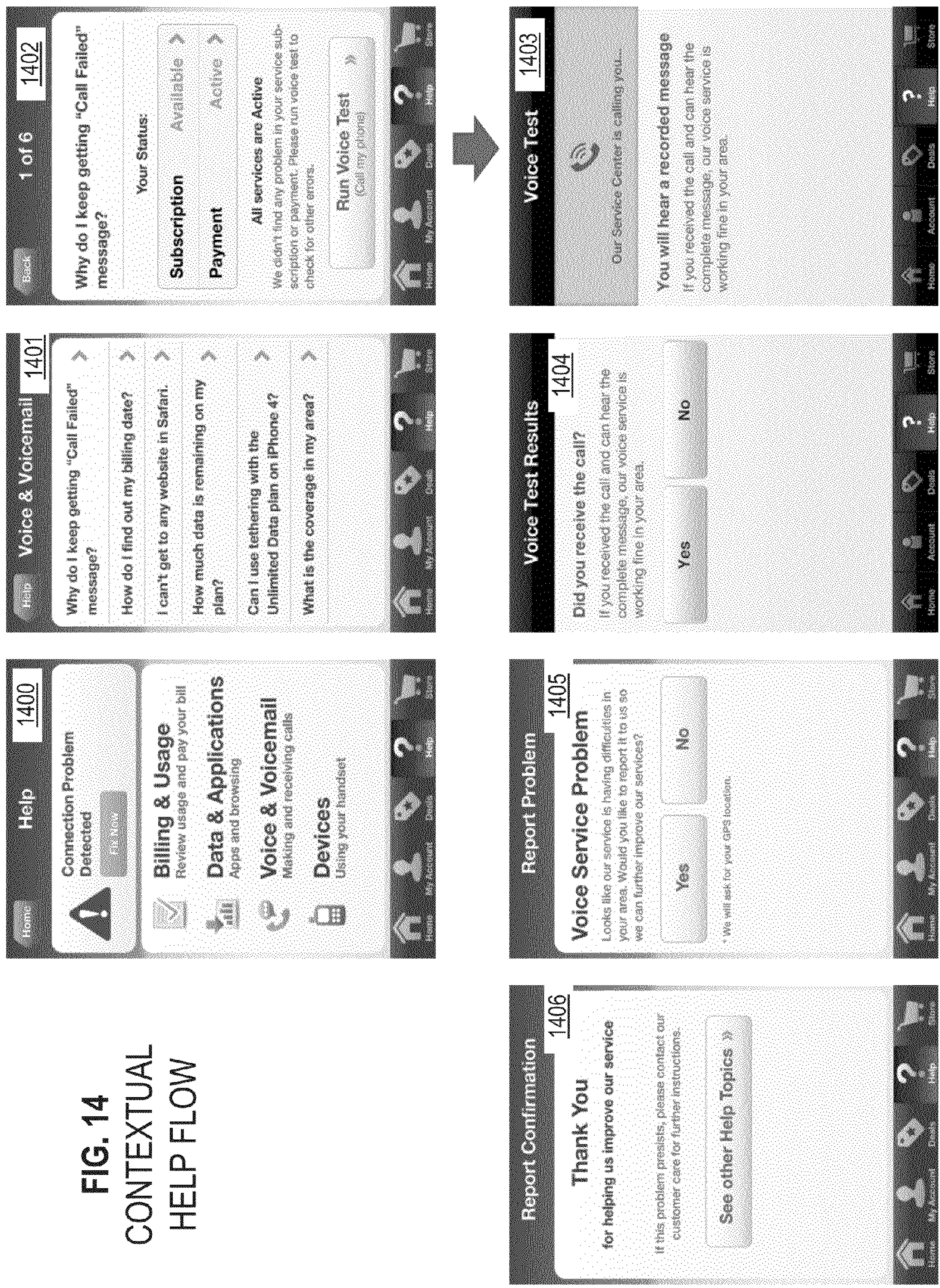
FIG. 14 is an embodiment of a display screen of a CDA that shows a "Contextual Help" feature.

FIG. 14 illustrates an example in which a connection problem is automatically detected without the user proactively running the diagnostic function. In this example, the top panel of the display shows that a connection problem has been detected (1400). The user can click a "Fix Now" soft button and see a list of questions that are relevant to the detected problem (1401). The user can select one of the questions to find more information; e.g., the user's current status that is relevant to the cause of the detected problem (1402). In this scenario, a voice test is recommended. The user can run the voice test to test his/her voice connection (1403 and 1404). For example, the user device can send a message to request a voice network component in the operator network to call the user device. If a problem is found, the user can choose whether to report the problem to the operator (1405). If the user chooses to report the problem, a report confirmation page (1406) is displayed. In other scenarios, the user can run a data connection test or a messaging test to request a data server or a messaging server in the operator network to call the user device. This "Help" feature is another example of a contextual action that provides a clear path towards resolution of an issue that a user current has.

Figures 15A, 15B:
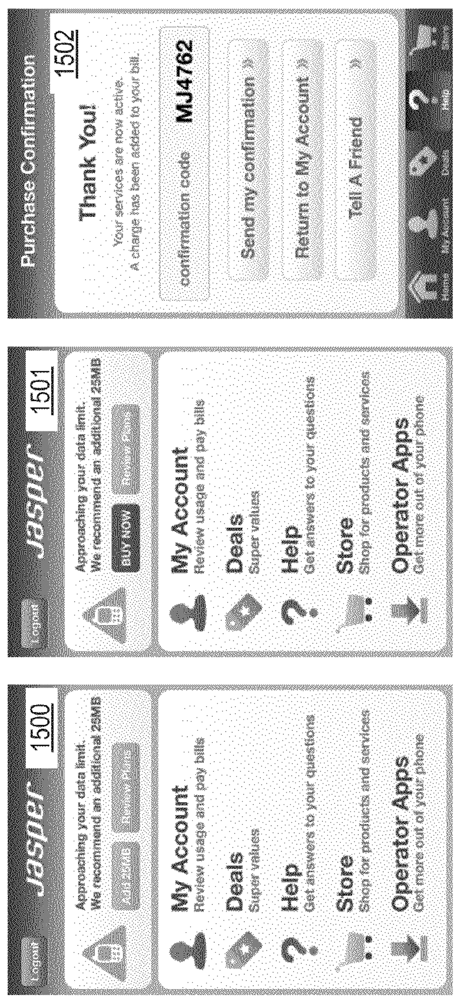
FIG. 15A is an embodiment of a display screen of a CDA that shows a "Usage Alert" feature.
FIG. 15B is an embodiment of a display screen of a CSP device application that shows a "Roaming Alert" feature.

FIG. 15A illustrates an example of a "User Alert" feature. In this example, when a user reaches his quota limit, the top panel of the display shows an alert and a top-up offer (1500). The alert may show that the user has exceeded his usage threshold but is still within the quota limit, or that the user has reached the quota limit. The user can select a top-up offer from the top panel without clicking into deeper levels of the menu (1501), or review more plan upgrade options. After the user selects the top-up offer and makes the purchase, a purchase confirmation page is displayed (1502). As described in connection with FIG. 6, the top-up offer and upgrade options can be created by the recommendation engine based on contextual assessment of the user's unique situation, and approved by the operator.

FIG. 15B illustrates an example of a "Roaming Alert" feature. In this example, a user roams into another network (or another area) but his plan does not support such roaming. The display shows an alert and a number of options (1530). The user can select any of the options to enable the roaming (1531). Each option is an offer created by the recommendation engine based on the contextual assessment described in connection with FIG. 6, and approved by the operator. After the user selects one of the options and makes the purchase, a purchase confirmation page is displayed (1532).

CSP—IT Integration

Referring again to FIG. 6, in one embodiment, CSP system 530 integrates with four functions of operator IT system 150 in the areas of CRM/care 610, provisioning/order entry 620, billing/payments 630 and reporting/DWH 640. CSP system 530 integrates with each of the four areas through a corresponding interface. The CRM interface supports rating, policy and offer management, campaign management and customer management and care. The provisioning/order entry interface enables the activation of selected services within the operator systems. The billing interface allows usage information to be shared with CSP system 530. Thus, a user can see his up-to-the-minute usage via CDA 140 without having to contact customer care. The reporting interface makes available the CSP-generated reports to all necessary functions within the operator.

The CSP experience provides both the consumer and the operator a number of self-service tools that can be used anytime and anywhere to manage their services. For the consumer, CSP system 530 offers the ability to see, select and purchase new services, as well as perform account management and self-support activities, such as account balance inquires, payment method changes; all from their smartphones (or another wireless communication device) and all in real time.

For the operator, CSP system 530 provides a suite of tools that enables the creation and management of all of the services and experiences received by the customer. For example, the operator's CRM system 610 can integrate with CSP system 530 to provide details on offers and services that CSP system 530 can recommend to the customer as upsells or standard sales offers, to view current account balances and usage, manage payments and to provide diagnostics to assist the user with self-service resolution of common support issues. CSP system 530 can also integrate with the operator's reporting and data warehouse systems 640 to provide financial, marketing and management reporting.

In one embodiment, integration between CSP system 530 and operator IT system 150 is based upon the availability of interfaces to selected systems and/or groups of systems. As CSP system 530 uses a model that abstracts its interfaces to the operator platform using an adaptation layer, these interfaces can vary from standards-based Web services APIs to secure file transfers.

In one embodiment, the interfaces enable not only the integration of CSP system 530 with operator IT system 150, but also the ability for an operator to manage its marketing campaign, offers, pricing, billing and customer care in an integrated environment. In one embodiment, this integrated environment is presented to the operator via CSP operator Web applications 154. CSP operator Web applications 154 may be run on a computer in the control center of operator IT system 150.

FIG. 16 illustrates an embodiment of a screen display of CSP operator Web applications (e.g., CSP operator Web applications 154 of FIG. 6). In this embodiment, the screen display includes a top panel that shows alerts and status 1601 and campaign results 1605. Alerts and status 1601 allows an operator (or more specifically, the administrators at the operator side) to communicate with each other with respect to the latest updates and status of operator network 110 and operator IT system 150 (FIG. 6). In one embodiment, the main panel of the display is divided into three regions: Create Offers and Policy 1602, View Customer Activity 1603 and Manage Communications 1604. Each of the three regions includes a number of task modules 1610-1618 that allow the administrators to perform specific tasks. The backend of task modules 1610-1618 is CSP system 530, or more specifically, CSP engines 122 (FIG. 6). When an operator clicks on any of task modules 1610-1618, the operator can be provided with templates and data that are generated by one or more CSP engines 122. CSP engines 122 generate the templates and data based on the information obtained from operator network 110 and operator IT system 150 (FIG. 6). In one embodiment, access to these task modules 1610 can be role-based; that is, an administrator with a marketing role may be able to access only a subset of task modules 1610-1618 while an administrator with a manager role may be able to access all of task modules 1610-1618.

In one embodiment, some of the task modules, such as pricing workstation 1610 and offers workstation 1611, allow the administrators to create offers and set pricing. In one embodiment, CSP system 530 can provide offers and pricing templates for the operator to fill in the details. Through subscriber portal 1612, an operator can design subscriber's on-device experience, also using the templates provided by CSP system 530. These templates allow the operator to set a pricing plan and package the pricing plan into an offer associated with a policy. The pricing, offer and policy are sent to CSP system 530 to allow CSP system 530 to deliver the right offers with the right pricing to the right subscribers at the right time. CSP system 530 can also provide other templates that can be used by the operator with a click on any of task modules 1610-1618.

In one embodiment, an operator can view the details (e.g., activities and history) about subscribers through the task module of subscriber details 1613, and perform operations on their accounts; e.g., activate or deactivate the accounts, change offers, apply promotions and other account administrative tasks. Custom alerts 1614 allow administrators of the operator to configure rules for alert-triggering events. These alerts may be accompanied by automated response to specific events for resolving the condition causing the alerts. The task module of reports 1615 allows the operator to review and analyze subscriber and financial data. For example, the operator can run a report to find out when a particular offer or a particular group of offers have reached a set market share or set usage.

In one embodiment, an operator can design campaigns to send offers and incentives to specific subscribers using campaign center 1616. In one embodiment, the offers and incentives can be delivered to CDA 140 on the user device via CSP system 530 (FIG. 6). In one embodiment, CSP system 530 can provide campaign templates for the operator to determine the specific details of campaigns. For example, the operator can decide on a plan and the recommendation engine of CSP system 530 can recommend a segment of subscribers to whom this plan should be offered. Alternatively, the operator can decide on a segment of subscribers and the recommendation engine can recommend a plan to offer to these subscribers.

In one embodiment, an operator can use customer alerts 1617 to set up an alert for specific subscribers and the rules associated with the alert. The alert can be displayed on the user device to allow a subscriber to take remedial action; e.g., to accept a top-up offer that is delivered with the alert to the subscriber. In one embodiment, the task module of analytics 1618 is backed by the recommendation engine of CSP system 530. Analytics 1618 allows the operator to identify trends and opportunities based on the subscribers' behavior and campaign results. For example, if the subscriber reaches his usage limit for the first time, analytics 1618 can recommend a top-up offer (which is valid only for this current billing cycle). If this is the fifth time within a five-month period that the subscriber has reached the threshold, analytics 1618 can recommend an upgrade offer such that the subscriber can switch to an upgraded plan and receive a higher quota limit every billing cycle.

As mentioned before, the integration of CSP system 530 and operator IT system 150 (FIG. 6) enables the functionality of CSP operator Web applications 154 described above. The following describes this integration with respect to CRM/care 610, provisioning/order entry 620, billing/payments 630 and reporting/DWH 640 (FIG. 6).

Figure 17:
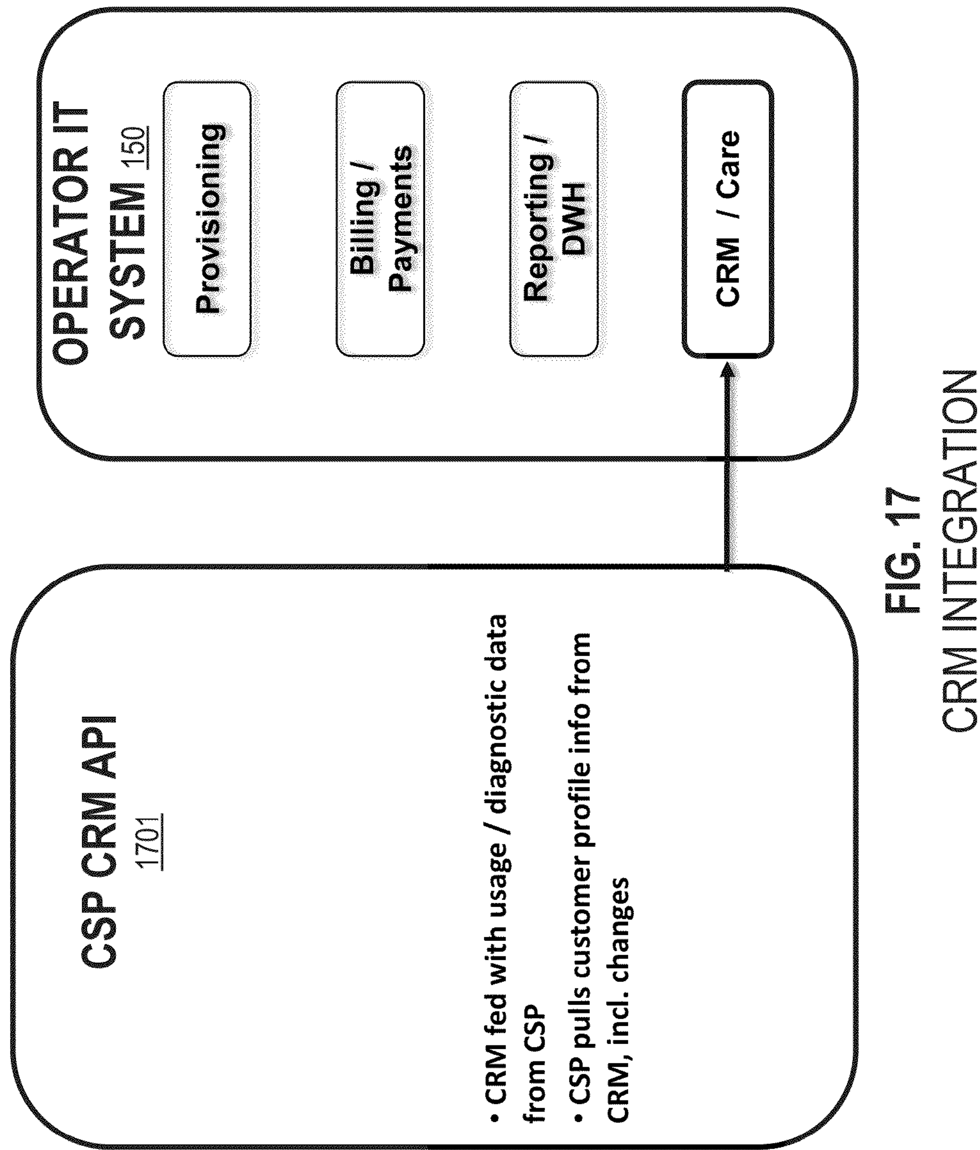
FIG. 17 is an embodiment of Custom Relationship Management (CRM) integration.

CRM Integration. FIG. 17 is an overview of CRM integration according to one embodiment of the invention. Referring also to FIG. 6, CSP system 530 includes a CSP CRM API 1701, which interacts with operator IT system 150 to manage or recommend strategies for CRM and care. Through CSP CRM API 1701, the operator's CRM system 610 is fed with usage and diagnostic data from CSP system 530, and CSP system 530 pulls customers profile information and updates from the CRM system 610. In one embodiment, CSP system 530 integrates with the operator's CRM system 610 in the following areas: Rating, Policy and Offer Management; Campaign Management; and Customer Management and Care.

CRM Integration Area (I): Rating, Policy and Offer Management (Product Catalog). Through the integrated rating, policy and offer management functions, CSP system 530 provides the operator a powerful set of tools to create, edit, approve and manage rate plans and policy actions for consumers. As the front-end interface to an integrated OCS and PCRF facility, CSP's Pricing and Offers engines (e.g., CSP engine 122 of FIG. 6) integrate with the operator's Product and Policy Catalog to pull current offers and create new offers and policy rules.

Depending on the nature of the product deployment, CSP system 530 can replicate offers currently in the operator's product catalog, create and push offers to the operator, or act as the master product catalog for rating. In all of these three cases, CSP CRM API 1701 provides proper synchronization between CSP system 530 and operator IT system 150, as well as ensuring availability of offers and policies. CSP CRM API 1701 allows CSP system 530 to access and pull offers. CSP CRM API 1701 also facilitates a submit/approve/publish method to push offers to the operator.

Through CSP CRM API 1701, CSP system 530 pulls all applicable offers, catalog rules, offer parameters and policy descriptions into an easy-to-use, self-service user interface that the operator's marketing personnel can use to quickly create new offers and promotions. In practice, the process to create and approve an offer touches many internal operator departments and may need some level of internal coordination and process to accomplish. To properly engage with and manage this need, CSP system 530 has an integrated approval workflow to prevent the use of these offers and policies until they are reviewed and approved by the appropriate operator-designated personnel. Once approved, the offers and policies can be pushed to the operator using CSP CRM API 1701 or a similar API.

A sample product catalog/rating/policy template is shown below.

TABLE 1

Sample (Basic Offer) Product Catalog Template

| Catalog Area | Field Name | Description |
|---|---|---|
| Identification | Offer Code | Operator's offer code used to identify the offer to CRM and other systems |
| | Offer Friendly Name | Name of the offer that will be presented in the CDA |
| | Applicable Service Type(s) | Service Type that this offer is applicable to (voice, data, etc.) |
| | Effective/Expiration Date(s) | When offer can be used/stops being offered |
| | Compatible Offer Code(s) | Codes of offers that are compatible (allowed to be purchased) with this offer |
| | Allowed payment types | Payment types (debit, credit card, prepaid) allowed for plan purchase |
| Rates | Primary Rating Type | First rating scheme as applicable to service type (by units of usage, time, destination, etc.) |
| | Rating Amount | Amount charged for rated usage |
| | Secondary Rating Type | Additional rating scheme as applicable to service type (by units of usage, time, destination, etc.) |
| | Rating Amount | Amount charged for rated usage |
| Policy | Policy Conditions | Selected policy conditions, e.g. throttle, redirect, notify |
| | Policy Actions | Parameter and action when policy condition is met |
| | Type of Offer | Standard offer, upsell or both. |

In case an API is not or cannot be made available, a manual synchronization process can be used to perform the actions that would be taken by the API. In this manual approach, the operator uses the CSP Pricing and Offer engines to create and publish the appropriate offers and policies. A key to success in this approach will be the creation of business processes that govern the speed and frequency of updates.

Figure 18:
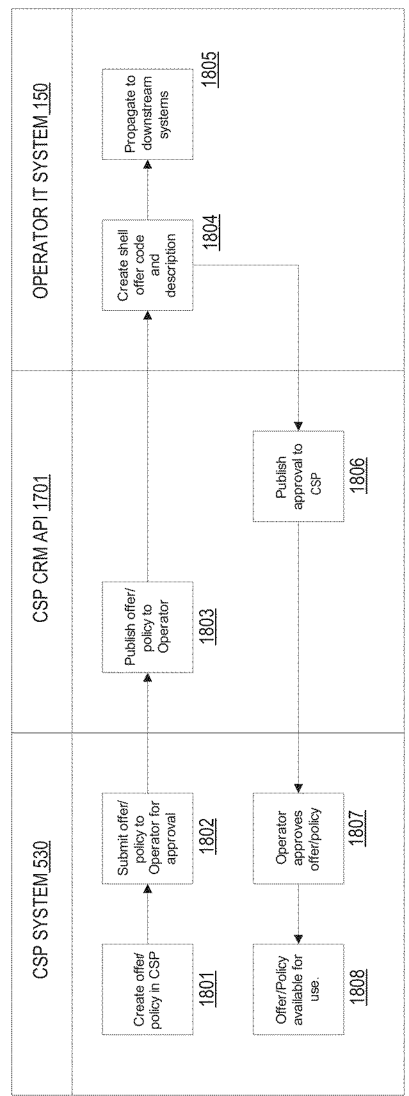
FIG. 18 is an embodiment of a process for publishing offer/policy from a CSP system to an operator.

FIG. 18 illustrates an example of an operation sequence that allows offers created by CSP system 530 to be modeled and managed in the operator's product catalog. In one embodiment, CSP system 530 creates an offer/policy template (or zero-rated offer) (1801). CSP system 530 then submits that offer/policy to the operator for approval (1802). CSP CRM API 1701 publishes the offer/policy to the operator (1803). Upon receipt of the offer/policy, operator IT system 150 creates shell offer code and description (e.g., by associating the parameters of that offer (Offer Code, etc.) to the CSP-created offer) (1804). Operator IT system 150 then propagates the offer/policy to downstream systems (1805). Thus, all downstream systems that are fed from the product catalog (Care, Finance, Reporting, etc.) receive information and updates during the normal course of business. Through CSP CRM API 1701, operator IT system 150 also publishes the approval to CSP system 530 (1806). Upon receipt of the operator's approval (1807), CSP system 530 makes the offer/policy available for use by the customers (1808).

CRM Integration Area (II): Campaign Management. In one embodiment, CSP system 530 includes Customer Alerts and Campaign engines (e.g., one or more of CSP engines 122 of FIG. 6), which use offers generated by the Pricing and Offer engines (e.g., one or more of CSP engines 122 of FIG. 6) to provide customers with automated and operator-generated upsell offers. The Customer Alerts engine allows the operator personnel to create and set automated alerts that provide customers notification of key lifecycle events, e.g. reaching a usage threshold, approaching a bill cycle date, accessing a non-included service such as roaming. Included in these alerts can be contextually relevant upsell offers that allow the customer to continue using services. The Campaign engine allows the operator's marketing personnel to either use CSP's integrated recommendations engine (one of CSP engines 122 shown in FIG. 6) to identify targeted lists of customers for receiving promotions, or to upload a pre-segmented list.

TABLE 2

Integrations Supporting Campaign Management

| Required Function | Description | Addressed in Integration Area |
|---|---|---|
| Usage data | Provides campaign analytics and recommendation | Network |
| Notifications | Sends SMS messages to customers that have received a campaign | |
| Service offers and upsells | Offers that have been approved for use as campaigns and upsells | Rating and Policy (Product Catalog) |
| Opt-In | Customer's preference to receive alerts, notifications and campaigns from the Operator | Customer Profile |
| Personalization | Information to create a more personal campaign as well as validate that the campaign is sent to the right consumer | |
| Report and Source Data | In the case that the Operator uses their own pre-segmented list of target customers. | Data Warehouse |

CRM Integration Area (III): Customer Management—Customer Profile. CSP system 530 is designed to address the sensitivity of the operator's customer data and the number of regulatory and legal issues. Integration between CSP system 530 and the operator's CRM customer profile is needed to enable several functions: authentication of CDA 140, personalization of offers and alerts, and knowledge of customer offers for recommendations and account management. In all cases, CSP system 530 looks to the operator's CRM system 610 as the master record for all customer data.

To protect end-customer data, all of the end-customer data is stored within the CSP customer database and managed in a manner that enables it to be secure and auditable at all times. Any changes made to the customer data are tracked using an audit trail that can be made available for reports, audits, etc. In addition, the CSP data centers can be deployed in specific geographical locations to accommodate data security, privacy and location requirements.

The integration that is required to store and update this data inside CSP system 530 can be accomplished using an API (e.g., CSP CRM API 1701 of FIG. 17) that enables data to be pulled from the operator's CRM system 610 using a commonly used and relatively unchanged key. In one embodiment, the key can be the International Mobile Subscriber Identity (IMSI) followed by the Mobile Station International Subscriber Directory Number (MSISDN). Depending on the nature of the product deployment, customers may be allowed to update their data through the CDA 140, e.g. change billing methods, addresses, etc. In this case, the same approach is recommended to update customer data inside the operator's systems.

Since the customer profile data feeds CSP's customer database and contains all of the customer's current plan information, the CRM integration also enables changes made outside of CSP system 530 to be reflected in the CDA 140 and CSP system 530. Thus, any changes to rating or policy parameters can be properly synchronized between CSP system 530 and the operator. To that end, changes made within the operator's customer care and/or retail ordering systems are pushed (recommended) or pulled periodically from the operator's CRM system 610 to CSP system 530. The CRM integration allows CSP system 530 to be constantly up-to-date with the operator's systems. In one embodiment, the API (e.g., CSP CRM API 1701 of FIG. 17) allows customer data to be rapidly accessed and updated. This is necessary because customer profile data is used in the display of account management functions, as well as a key input into the CSP recommendations engine.

In one embodiment, CSP system 530 uses the following information in the customer profile for CRM integration:

TABLE 3

| Customer Profile Fields and CSP Functions that Use These Fields | | | | |
|---|---|---|---|---|
| Field Name | Description | Authentication | Recommendation | AccountMgt |
| IMSI | Customer's IMSI | x | | |
| MSISDN | Customer's phone number | x | | |
| Customer Name | Customer's billing name | x | | x |
| Billing Account Number | the Operator's billing account for customer | x | | x |
| Contract Date (tenure) | Original contract date or tenure of customer | x | x | |
| Current Plan Type | Prepaid or postpaid | | x | x |
| Current Voice Plan | Current plan | | x | x |
| Current Data Plan | | | x | x |
| Current Messaging Plan | | | x | x |
| Current "other" Plan | Current non-mobile or other service plan | | x | x |
| Bill Cycle Date | Postpaid bill cycle date or prepaid expiration date | | x | x |
| Previous Voice Plan | Most recent | | x | x |
| Previous Data Plan | changed plan | | x | x |
| Previous Messaging Plan | | | x | x |
| Previous "other" Plan | | | x | x |
| IMEI/Device Type | Device type identifier or IMEI - the latter is preferred | x | x | |
| Opt-In Status | Customer's election to receive notifications | | x | |
| Campaign Opt-In Status | Customer's election to receive campaigns and promotions | | x | |
| Current campaign | Campaign customer is currently attached to (if any) | | x | |

CRM Integration Area (VI): Customer Management—Customer Care. CSP system 530 has a number of customer management capabilities that can be useful to the operator's customer care and customer management teams.

In one embodiment, CSP system 530 does not directly push data into the operator's CRM system 610. Rather, it assumes that integrations are already in place within the operator's infrastructure to pass information, for example, from the product catalog, provisioning/ordering and similar systems to the CRM system 610. If a direct push integration to the CRM system is necessary, CSP system 530 can provide information via an API to the CRM system 610 on a per-event or time-basis.

In one embodiment, CSP system 530 can, via an API, allow the operator's CRM system 610 to provide diagnostic, current offer and current usage data. Since CSP system 530 is both the rating and policy management engine, a customer current usage and policy status, e.g. throttled or not throttled can be made available to the CRM system 610. One key component of the CSP system 530 is the ability to push advanced service and network-level diagnostics to the handset and provide the user timely and actionable feedback to solve issues.

While one of the key attributes of the CSP system 530 and CDA is the ability to allow a customer to perform a majority of account management and self-support issues, it may be unavoidable that sometimes the customer will call customer care. When the customer does call customer care, the customer care agent (or a technical support representative) can, via the API, pull diagnostic information into their normal systems and provide assistance to the customer. In the case where the CRM system cannot integrate to an external data source, CSP system 530 can be setup to launch-in-context (LIC) along with the customer care representative's existing tools.

Provisioning/Order Entry Integration. Prior to the description of provisioning/order entry integration, it is useful to differentiate between order management and provisioning/order entry functions. Order management functions aggregate customer selections for offers, payment methods and any other updates and pass that information to a provisioning/order entry system that allows access to those ordered services on the network.

Since CSP system 530 may be the master rating and policy engine, it can enable access to the selected services and then integrate with the order management system to feed data to downstream systems, e.g. care, reporting and CRM. This integration assumes the existence of interfaces between the order management and related downstream systems (e.g., CRM and reporting) to manage activities such as customer activation, service changes, device changes and updating financial and marketing reports.

Figure 19:
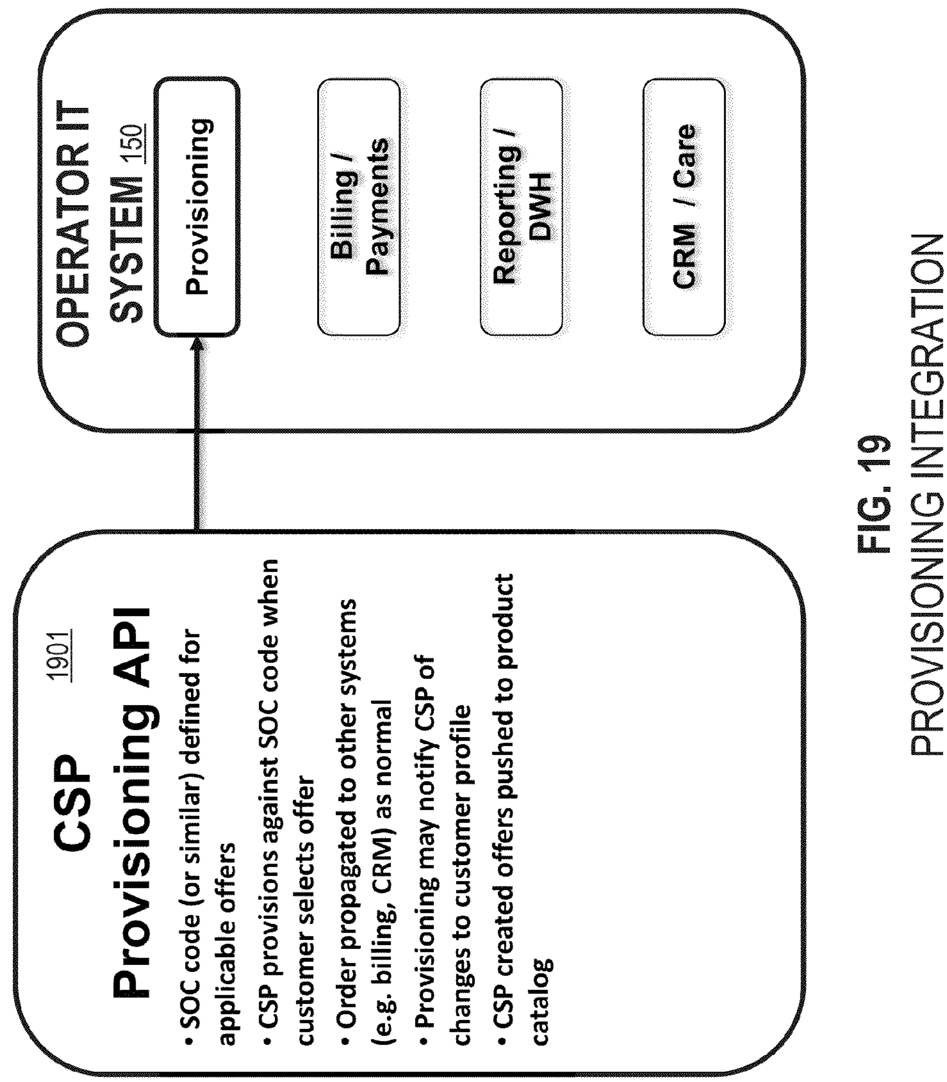
FIG. 19 is an embodiment of provisioning/order entry integration.

FIG. 19 is an overview of provisioning/order entry integration according to one embodiment of the invention. Referring also to FIG. 6, CSP system 530 includes a CSP provisioning/order entry API 1901, which interacts with operator IT system 150 to manage service provisioning/order entry. In one embodiment, CSP provisioning/order entry API 1901 defines service offer codes (SOCs) for offers that are applicable to one or more customers. When the customer selects an offer, CSP system 530 provisions the selected service against the SOC code. The selected offer is then propagated to other systems (e.g., CRM and billing). Through CSP provisioning/order entry API 1901, CSP system 530 can be notified of changes to customer profile, and CSP-created offers can be pushed to the product catalog.

In one embodiment, CSP system 530 is provided with the appropriate identifiers for all available provisioned services. These codes (and associated parameters) are known as service offer codes (SOC) and can be used by CSP system 530 to inform the provisioning/order entry system to allow a customer access to their selected offers. For data services, CSP system 530 can provision service access on its integrated PCRF based upon the customer's selections, and submit, via CSP provisioning/order entry API 1901, the appropriate SOC, any relevant parameters and a customer identifier (IMSI or MSISDN) directly to the provisioning/order entry system for fulfillment. In parallel, CSP system 530 can send the same information via a Web services interface to the operator's order management system for further processing and population of downstream systems. In an alternative embodiment, the operator can choose to provision its PCRF with the same information as CSP system 530.

Figure 20:
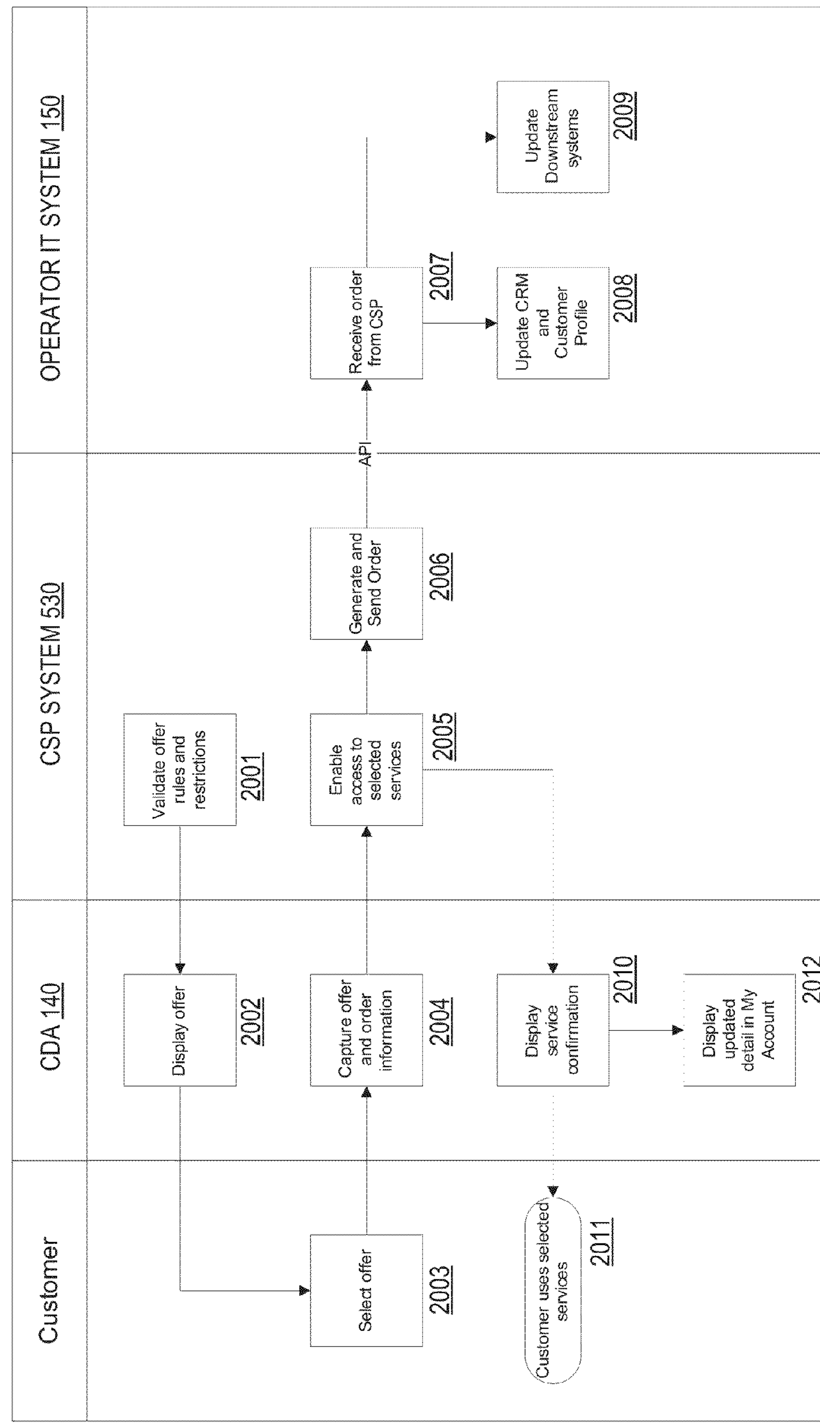
FIG. 20 is an embodiment of a process for provisioning/order entry integration.

FIG. 20 illustrates an example of an operation sequence that provisions the offers selected by customers. In one embodiment, CSP system 530 validates offer rules and restriction (2001), and signals CDA 140 to display offers (2002). When the customer selects an offer (2003), CDA 140 captures the offer and order information (2004). In response, CSP system 530 enables access to selected services (2005). At this point, CSP system 530 generates and sends the order to operator IT system 150 via an API (e.g., CSP provisioning/order entry API 1901) (2006), and in parallel, signals CDA 140 to display service confirmation (2010). When operator IT system 150 receives the order from CSP system 530 (2007), it updates CRM and customer profile (2008) as well as downstream systems (2009). After CDA 140 displays service confirmation (2010), the customer can start using the selected services (2011). CDA 140 can further display updated details in My Account (e.g., the My Account feature shown in FIG. 11).

CSP system 530 also offers the ability to offer and provision other mobile (voice, messaging) and non-mobile services (DSL, insurance) that are not rated by CSP system 530. In this case, CSP system 530 can, using the same mechanisms noted above, provide the provisioning/order entry and ordering systems the appropriate SOC (or equivalent) code, allowing the appropriate network elements (e.g., HLRs) and IT platforms (CRM) to be updated. To that end, all of the products and services offered by the operator need to be provided to CSP system 530, placed in the product catalog and synchronized.

As previously noted, CSP system 530 receives information about a customer's current services and selections from the customer profile database. If a change is made to the customer's plans or services via the Care or Retail system, these changes and their associated provisioning/order entry changes are sent to CSP system 530.

Billing Integration. In one embodiment, CSP system 530 integrates with the operator's billing system in the following areas: Rating of Data Usage, Self-Service Account Management and Risk Management and Payment.

Figure 21:
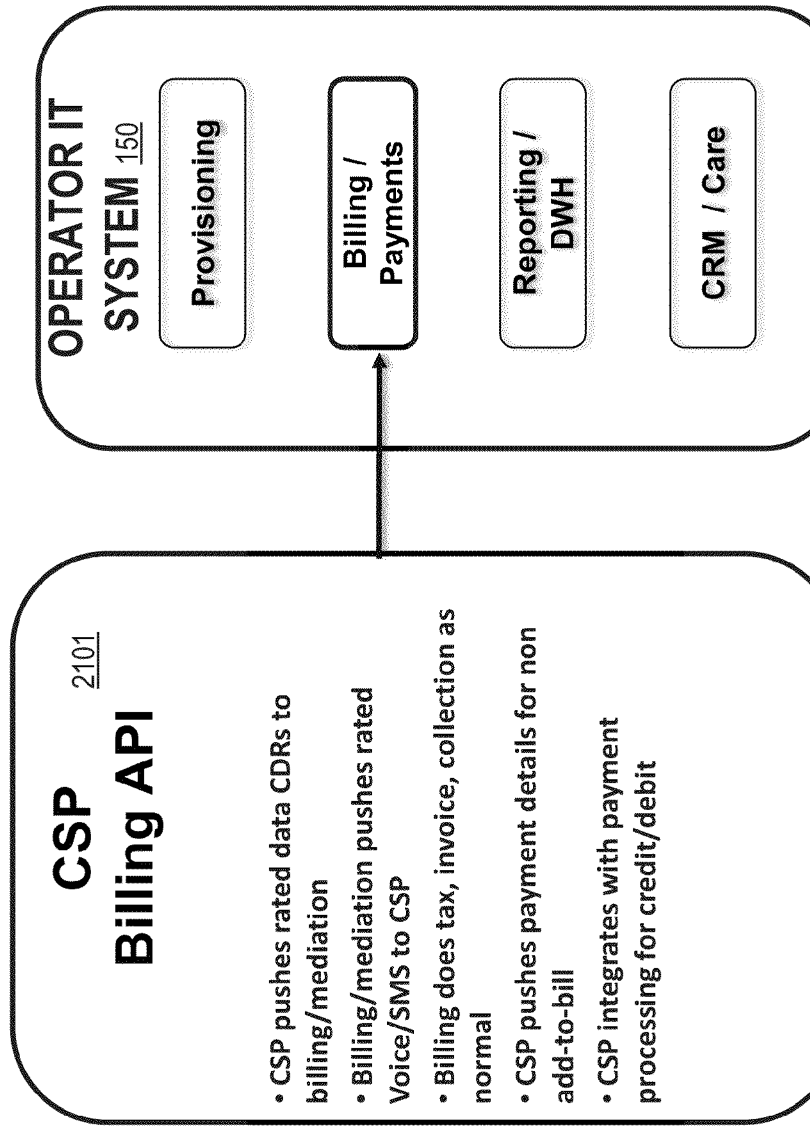
FIG. 21 is an embodiment of billing integration.

FIG. 21 is an overview of billing integration according to one embodiment of the invention. Referring also to FIG. 6, CSP system 530 of FIG. 6 includes a CSP billing API 2101, which interacts with operator IT system 150 to manage billing and payments. In one embodiment, through CSP billing API 2101, CSP system 530 pushes rated data CDRs to billing/mediation system, and billing/mediation system pushes rated voice and SMS to CSP system 530. CSP system 530 is integrated for credit/debit processing. CSP system 530 can push payment details to operator's billing/mediation system. The operator's billing system does tax, invoice and collection.

Billing Integration Area (I): Rating of Data Usage. In one embodiment, a CSP-integrated OCS can be used to rate data usage for customers that are managed by CSP system 530. The rates and policies used by the OCS can be stored and managed by CSP system 530.

In one embodiment, CSP system 530 can rate usage and calculate charges on a per session basis. Depending on the nature of the product deployment, CSP system 530 can either store, aggregate and format usage into an invoice-ready format, or send rated, per-session usage to the operator's CRM or other system. If the former, CSP system 530 can provide the invoice-ready data feeds to a mutually agreed sFTP site for the operator to pick up and include into its billing process a set number of days prior to the close of the billing cycle.

In the latter option, CSP system 530 can post, on a per-session basis, aggregated usage including the customer identifier (IMSI or MSISDN), plan code and total usage. In one embodiment, this integration will be managed through the use of an API (e.g., CSP billing API 2101) that can directly feed the operator billing system. A known analogue to this type of integration is one where a third party provides a "bill on behalf of" service to an operator. In this case, CSP system 530 will be charging data usage on behalf of the operator and providing that rated usage for use by downstream financial systems (e.g., taxation) as well as CRM and reporting systems. If an API cannot be made available, these data can be posted to a sFTP site.

Billing Integration Area (II): Self Service Account Management. A key feature of the CDA 140 is the ability for the customer to view, in real time, current service usage. In an embodiment where CSP system 530 is rating data and the operator is rating voice and SMS, it is necessary to integrate with the operator's usage management systems to get rated and/or aggregated usage for those services. Depending on the operator system that sources this data, a push API or sFTP file transfer can be used to get these data. A key factor in determining how to perform this integration is how fast the usage information can be made available via the interface. If there is a delay greater than a pre-defined time period (e.g., 15 minutes between usage completion and CDR delivery), a secondary method may be used to enable the "real-time" nature of the CDA 140 account management function. In this case, the customer profile integration may be a candidate to pull current, aggregated usage.

Billing Integration Area (III): Risk Management and Payment. Depending on the nature of the product deployment, CSP system 530 can also integrate with the operator's risk management and payment systems. The integration with these services is highly dependent on the service used and where it sits within the operator infrastructure. The ideal integration with CSP system 530 is to use an existing interface, e.g. the customer profile to determine the risk score for a customer and use that along with the catalog rules sourced from the product catalog integration to determine payment risk.

In addition, CSP system 530 can, as part of the order management and provisioning/order entry transaction, send a payment type and payment details. This is necessary if the operator wants to enable prepaid or credit card payments for services purchased via CDA 140. In this case, the integration is also highly dependent on the target system and its location within the operator infrastructure. Typically, CSP system 530 can interface with but does not actually store or process any payments.

Data Warehouse/Business Intelligence Integration.

Figure 22:
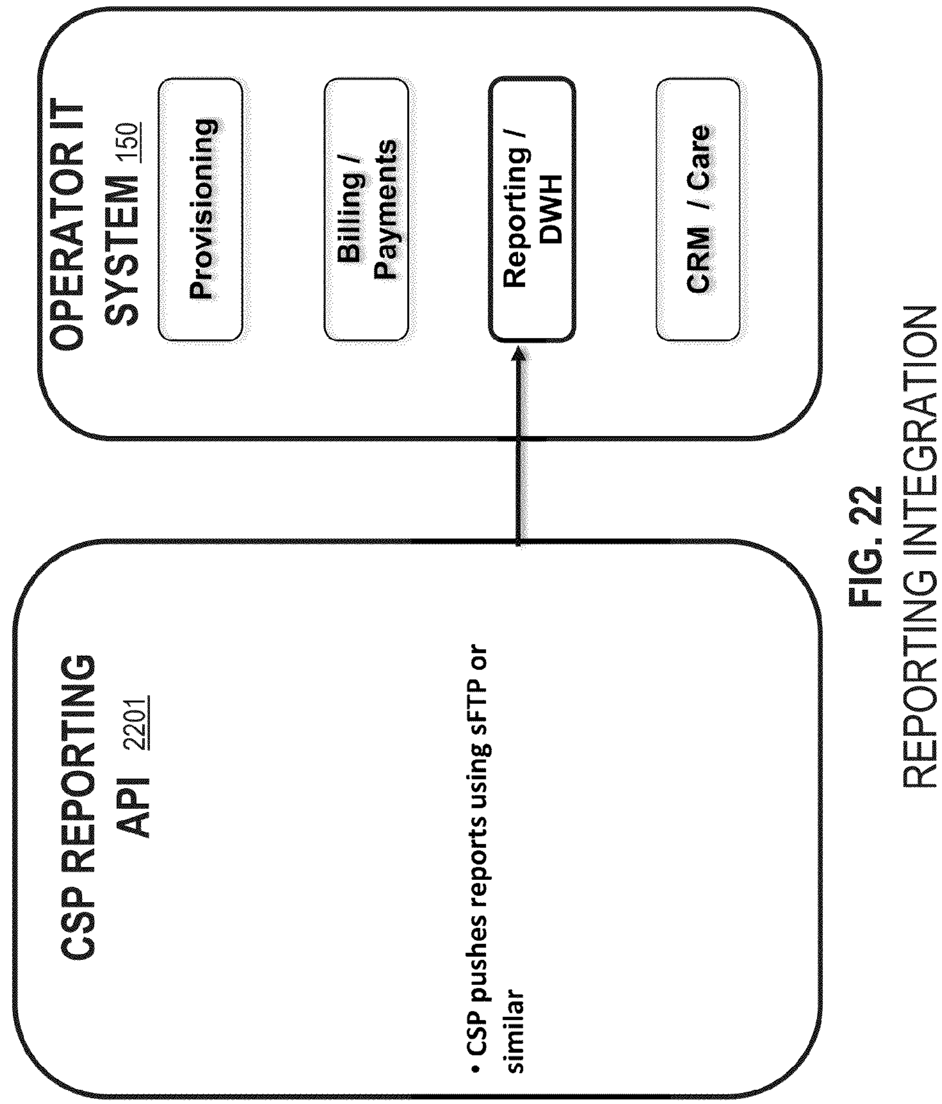
FIG. 22 is an embodiment of reporting integration.

FIG. 22 is an overview of data warehouse integration according to one embodiment of the invention. Referring also to FIG. 6, CSP system 530 of FIG. 6 includes a CSP reporting API 2201, which interacts with operator IT system 150 to manage data warehouse. In one embodiment, through CSP reporting API 2201, CSP system 530 can push reports to operator IT system 150 using a sFTP interface or a similar interface. The sFTP interface can be over the Internet. In some embodiments, a Virtual Private Network (VPN) can be used for additional security.

In some embodiments, CSP system 530 provides over twenty reports for use by an operator, such as daily subscriber report, usage detail reports, reports on charges of all kinds, and the like. Reports can be generated daily and/or monthly, and delivered to the operator.

Thus, a method, system and apparatus for a Core Service Platform (CSP) has been described. It is to be understood that the techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system for managing wireless devices in a mobile wireless network comprising:

a processor; and a memory coupled with the processor, wherein the memory is configured to provide the processor with instructions which when executed cause the processor to:

receive a diagnostic request to analyze a problem associated with a wireless device operating in the wireless network;

retrieve diagnostic information associated with the wireless device from the wireless network comprising verifying wireless device connectivity with the wireless network by checking a home location register (HLR) for wireless signaling activity including at least one of a GSM authorization request, a mobile switching center (MSC) location update, and a serving GPRS support node (SGSN) location update;

retrieve diagnostic information associated with the wireless device from the wireless device;

determine at least one solution for the problem associated with the wireless device based on the retrieved diagnostic information from the mobile wireless network and the wireless device;

transmit the at least one solution; and receive a confirmation that the problem has been resolved.

2. The system of claim 1, wherein the diagnostic information is retrieved from at least one of a HLR system, a radius system, a short message system center (SMSC) system, a SIM system, a MSC system, a SGSN system, a GSM Authorization request system, an authentication failure system, a data session system, a packet data protocol (PDP) system, or a short message system ,(SMS) system.

3. The system of claim 1, wherein the processor transmits the at least one solution to a charging gateway in the wireless network.

4. The system of claim 1, wherein the system receives the diagnostic request and activates a diagnostic function to identify the problem associated with at least one of a Connectivity issue, a Coverage issue, a Subscription issue, a Usage issue, a Payment issue, and a Roaming issue.

5. The system of claim 1, wherein the diagnostic request is initiated by the wireless network.

6. The system of claim 1, wherein the diagnostic request is initiated by the wireless device.

7. The system of claim 1, wherein the instructions when executed verify Internet Packet (IP) network connectivity by checking a GGSN for real-time IP traffic statistics and diagnosing the problem based on a detected pattern of upload bytes and download bytes.

8. The system of claim 1, wherein the processor retrieves diagnostic information including local environment statistics including wireless signal strength from the wireless device, wherein the local environment statistics are utilized for performing diagnostics for the wireless device.

9. The system of claim 1, wherein the processor retrieves diagnostic information including local environment statistics from a plurality of wireless devices operating in the wireless network, wherein the local environment statistics are aggregated across the plurality of wireless devices to construct an estimate of the conditions in a given geographical area.

10. The system of claim 1, wherein the processor retrieves diagnostic information including local environment statistics including at least wireless signal strength from a plurality of wireless devices operating in the wireless network, wherein the local environment statistics are aggregated across the plurality of wireless devices to construct an estimate of the conditions in a given geographical area.

11. A wireless device for operation in a wireless network comprising:

a processor;

a radio receiver and transmitter unit coupled to the processor;

a graphical user interface (GUI) coupled to the processor; and a memory coupled to the processor, wherein the memory is configured to provide the processor with instructions which when executed cause the processor to:

receive a diagnostic request from the GUI to analyze a problem associated with the wireless device operating in the wireless network;

retrieve diagnostic information associated with the wireless device from the wireless network comprising verifying wireless device connectivity with the wireless network by checking a home location register (HLR) for wireless signaling activity including at least one of a GSM authorization request, a mobile switching center (MSC) location update, and a serving GPRS support node (SGSN) location update;

retrieve diagnostic information associated with the wireless device from the wireless device;

determine at least one solution for the problem associated with the wireless device based on the retrieved diagnostic information from the wireless network and the wireless device;

transmit the at least one solution to the wireless network; and display the at least one solution on the GUI.

12. The wireless device of claim 11, wherein the diagnostic information is retrieved from at least one of a HLR system, a radius system, a short message system center ,(SMSC) system, a SIM system, a MSC system, a SGSN system, a GSM Authorization request system, an authentication failure system, a data session system, a packet data protocol ,(PDP) system, or a short message system ,(SMS) system.

13. The wireless device of claim 11, wherein the processor retrieves diagnostic information including local environment statistics including wireless signal strength from the wireless device, wherein the local environment statistics are utilized for performing diagnostics for the wireless device.

14. The wireless device of claim 11, wherein the processor retrieves diagnostic information including local environment statistics from a plurality of wireless devices operating in the wireless network, wherein the local environment statistics are aggregated across the plurality of wireless devices to construct an estimate of the conditions in a given geographical area.

15. The wireless device of claim 11, wherein the processor retrieves diagnostic information including local environment statistics including at least wireless signal strength from a plurality of wireless devices operating in the wireless network, wherein the local environment statistics are aggregated across the plurality of wireless devices to construct an estimate of the conditions in a given geographical area.

16. The wireless device of claim 11, wherein activating a Help option on the GUI activates a diagnostic function that determines that a connection problem has been detected and presents a Fix Now sub option.

17. The wireless device of claim 11, wherein the instructions when executed verify Internet Packet (IP) network connectivity by checking a GGSN for real-time IP traffic statistics and diagnosing the problem based on a detected pattern of upload bytes and download bytes.

18. A diagnostic method conducted in a wireless network comprising:

receiving a diagnostic request to analyze a problem associated with a wireless device operating in the wireless network;

retrieving diagnostic information associated with the wireless device from the wireless network comprising verifying wireless device connectivity with the wireless network by checking a home location register (HLR) for wireless signaling activity including at least one of a GSM authorization request, a mobile switching center (MSC) location update, and a serving GPRS support node (SGSN) location update;

retrieving diagnostic information associated with the wireless device from the wireless device; and determining at least one solution for the problem associated with the wireless device based on the retrieved diagnostic information from the wireless network and the wireless device.

* * * * *